United States Patent
Palanisamy et al.

(10) Patent No.: US 9,589,250 B2
(45) Date of Patent: Mar. 7, 2017

(54) SYSTEM AND METHOD FOR ASSET REGISTRATION WORKFLOWS UTILIZING AN EVENTING INFRASTRUCTURE IN A METADATA REPOSITORY

(75) Inventors: Muthukumar S. Palanisamy, Sunnyvale, CA (US); David S. Keyes, Clinton, OH (US); Catherine Betz Lippert, Solon, OH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1431 days.

(21) Appl. No.: 12/352,583

(22) Filed: Jan. 12, 2009

(65) Prior Publication Data

US 2009/0182610 A1   Jul. 16, 2009

Related U.S. Application Data

(60) Provisional application No. 61/020,646, filed on Jan. 11, 2008.

(51) Int. Cl.
    *G06F 17/00* (2006.01)
    *G06F 7/00* (2006.01)
    *G06Q 10/10* (2012.01)
    *G06Q 10/06* (2012.01)

(52) U.S. Cl.
    CPC ............. *G06Q 10/10* (2013.01); *G06Q 10/06* (2013.01)

(58) Field of Classification Search
    CPC ...................................... G06Q 10/10
    USPC ................................. 707/700, 600
    See application file for complete search history.

(56) References Cited

U.S. PATENT DOCUMENTS

| | | | |
|---|---|---|---|
| 7,080,355 B2 | 7/2006 | Carlson | |
| 7,197,466 B1 | 3/2007 | Peterson | |
| 7,322,024 B2 | 1/2008 | Carlson | |
| 7,895,563 B2* | 2/2011 | Carlson et al. | 717/102 |
| 9,268,849 B2* | 2/2016 | Siedlecki | G06F 17/30864 |
| 2002/0032626 A1* | 3/2002 | DeWolf et al. | 705/35 |
| 2005/0043979 A1* | 2/2005 | Soares et al. | 705/7 |

(Continued)

OTHER PUBLICATIONS

"SOA Software Acquires LogicLibrary," pp. 1-2, http://www.logiclibrary.com.

(Continued)

*Primary Examiner* — Kimberly Wilson
(74) *Attorney, Agent, or Firm* — Tucker Ellis LLP

(57) ABSTRACT

Described herein is a system and method for automating asset workflows in a service metadata repository. A service metadata repository includes an event model for generating one or more events based on a change to one or more assets. A persistent message stores the one or more events. A subscription service provides the ability to subscribe to one or more events and register one or more subscribed web service endpoints where the one or more events will be delivered. A delivery service matches the one or more events to the one or more web service endpoint and delivers the one or more events to a notification service. A notification service notifies the one or more subscribed web service endpoints of the one or more events. One or more workflows automate asset registration based on rules configured in an XML file, wherein the one or more workflows are initiated upon receiving the one or more events at a subscribed web service endpoint.

16 Claims, 27 Drawing Sheets

(56) References Cited

U.S. PATENT DOCUMENTS

| | | | |
|---|---|---|---|
| 2005/0193341 A1* | 9/2005 | Hayward et al. | 715/716 |
| 2006/0047810 A1 | 3/2006 | Herzog | |
| 2006/0085412 A1* | 4/2006 | Johnson et al. | 707/4 |
| 2006/0184932 A1 | 8/2006 | Burnley | |
| 2006/0195473 A1* | 8/2006 | Lin et al. | 707/104.1 |
| 2007/0033567 A1 | 2/2007 | Carlson | |
| 2008/0072290 A1* | 3/2008 | Metzer et al. | 726/3 |
| 2008/0103990 A1* | 5/2008 | Danielson | G06Q 10/06 705/400 |
| 2009/0083239 A1* | 3/2009 | Colgrave et al. | 707/4 |
| 2009/0097397 A1* | 4/2009 | Moreira Sa de Souza | 370/216 |
| 2009/0254422 A1* | 10/2009 | Jenkins et al. | 705/11 |

OTHER PUBLICATIONS

"LogicLibrary Introduces Logidex 5.5," Enterprise Networks & Servers, May 2007, pp. 1-3, http://www.enterprisenetworksandservers.com/monthly/art.php?3156.

"Pennsylvania Enterprise Asset Repository (PEAR)", pp. 1-2, http://www.portal.state.pa.us/portal/server.pt?open=512&objID=3783&&SortOrder=100&level=2&parentid=3559&css=L2&mode=2#about.

"Service Oriented Architecture (SOA) Governance for Rapid Decision Making (DRAFT)," Texas Health and Human Services System, pp. 1-53, http://architecture.hhsc.state.tx.us/myweb/Documentspage/documents/ Governance Policies for Infravio Registry061406.doc.

"BEA AquaLogic® Enterprise Repository—Configuring and Managing Advanced Registration Flows," Version 3.0, Revised Oct. 2007, http://download.oracle.com/docs/cd/E11036_01/aler30/pdf/workflow.pdf.

"IT Procurement Suite," pp. 1-4, http://www.apttus.com/it.php.

"IBM Tivoli Asset Management for IT," May 2007, pp. 1-6, IBM Corporation Software Group, ftp://ftp.software.ibm.com/software/tivoli/partners/playbooks/sram/TID10269-USEN-01.pdf.

Toft, Henrik, "IBM Tivoli Asset Management for It," Jun.10, 2008, pp. 1-43, IBM Service Management, http://www-05.ibm.com/dk/news/events/itupdate/pdf/16_IBM_IT_Asset_Lifecycle_Management_ved_Henrik_Toft.pdf.

"HP puts more automation into SOA governance," pp. 1-4, Network World, http://www.networkworld.com/news/2008/100608-hp-soa.html.

Larsen, Grant, et al., IBM, "Asset lifecycle management for service-oriented architectures," Oct. 15, 2005, pp. 1-17, http://www.ibm.com/developerworks/rational/library/oct05/wilber/.

Wolfe, Robert, "NASA Earth Science Data Systems (ESDS) Software Reuse Working Group," Asset Repository and CM Strike Team Workshop, Feb. 21, 2006, pp. 1-30, https://acc.dau.mil/GetAttachment.aspx?id=44940&pname=file&aid=13045&lang=en-US.

CSR Virtual, "Online Collaboration, Color and Digital Asset Management," pp. 1-2, S-Marc, http://www.marcustechnology.com/pdfs/Csr%20Virtual%20Brochure.pdf.

"Scorpus™, Creating wealth through software reuse," Canarys™ Automations, Ltd., http://www.scorpus.com/why%20scorpus%20solution%20first.htm.

"Top SOA Vendors Endorse LogicLibrary Design-Time Repository and Registry Approach to SOA Governance," Mar. 14, 2006, pp. 1-3, BNET, Business Wire, http://findarticles.com/p/articles/mi_m0EIN/is_/ai_n26793152.

"Learn More About Logidex," LogicLibrary, pp. 1-3, http://www.logiclibrary.com/solutions/logidex.php.

http://www.logiclibrary.com/resources/guided_tour/tour.php, Logidex Guided Tour, LogicLibrary, pp. 13, 33.

"LogicLibrary Introduces Smart Controls for SOA Governance; Next Generation of Metadata Management Gives Organizations the Ability to Govern All Software Development Assets within Service-Oriented Architectures," May 23, 2005, pp. 1-2, BNET, Business Wire, http://findarticles.com/p/articles/mi_m0EIN/is 2005 May 23/ai n13773260.

"Repository Manager—SDA Mapping and Discovery," SOA Software™, pp. 1-3, http://www.soa.com/index.php/section/products/repository_manager/.

"LogicLibrary Introduces Logidex 5.5," pp. 1-2, BNET.com, Business Wire, 2007, http://findarticles.com/p/articles/mi_m0EIN/is_2007_May_1/ai_n27220147.

SOA Software™, "Partner Registration," pp. 1-106, http://www.soa.com/index.php/section/products/logidex/.

Blechar, Mike, et al., "SOA Software Acquires LogicLibrary to Widen Governance Offering," May 19, 2008, pp. 1-3, http://www.gartner.com/DisplayDocument?ref=g_search&id=673510.

SOA Software™, "Governance Automation," pp. 1-2, http://www.soa.com/index.php/section/solutions/governance_automation/.

Manes, Anne T., "The Registry and SOA Governance Market Landscape," Version 1.0, Jan. 31, 2007, Burton Group, http://www.burtongroup.com/Client/Research/ExternalContent/theregistrya.pdf?source= registryandsoa.

"LogicLibrary Releases Logidex 5.0 for .NET," Mar. 5, 2007, pp. 1-3, On-Demand Enterprise, http://www.on-demandenterprise.com/offthewire/26048284.html.

Wilkes, Lawrence, "Product Report—Software Development Asset Management with LogicLibrary Logidex," Jun. 2005, CBDI Journal, CBDI Forum Limited, http://www.logiclibrary.com/resources/analyst_files/cbdi_report.pdf.

IBM Information Management Resource Catalog, "Logidex," http://www.techguideonline.com/ibm/datasheet.php?ds=41.

"Pear Glossary," Version 1.0, pp. 1-21, Business Solutions Center of Excellence (BSCoE), http://www.portal.state.pa.us/portal/server.pt/gateway/PTARGS_0_75764_304681_0_0_18/Pear Glossary.doc.

http://www.portal.state.pa.us/imageserver/videos/findingassetsl.wmv, Time: 14:57 to 15:04.

* cited by examiner

600 ⬎

```xml
<!--Community Flows-->
<state name="urn:com:events:type:AssetSubmission">
    <action>CommunityAccept</action>
</state>

<!--Multi_tier Flows-->
<state name="urn:com:events:type:AssetAccepted">
    <action>MultiTier1_Tier_Assign</action>
</state>
<state name="urn:com:events:type:AssetTabApproved">
    <action>MultiTier_NextTier_Assign</action>
</state>

<!--Asset Registration Status Flows-->
<state name="urn:com:events:type:AssetAllTabApproved">
    <action>AllTabsApproval_Register</action>
</state>
```

Available Metadata Change Events / States
urn:com:er:events:type:MetaDataChange:name
urn:com:er:events:type:MetaDataChange:version
urn:com:er:events:type:MetaDataChange:description
urn:com:er:events:type:CategorizationChanged:assetLifecycleStage
urn:com:er:events:type:CategorizationChanged:classification
urn:com:er:events:type:MetaDataChange:supported

2502

Available Flows That Can Be Wired to Actions
ChangeCAS – applies one or more Custom Access settings to an asset
ChangeAssetLifecycle – sets the Asset Lifecycle Stage of an asset
ChangeClassification – sets the classification of an asset
ReAssignAssetToRegistrar – assigns the asset to Registrar
AddCommunityTag – saves the "Community" of an asset to the repository
NotifySubscriber – notifies the Subscribers about the Metadata Change
NotifyRegistrationActors – notifies the Registrar, Subscribers, Owners
NotifyCustomUser – notifies configured custom users about the Metadata Change
UnapproveChangeManagementTab – triggers the Change Management process
ResentChangeManagementTab – resets the "Reason for reassignment" field in the Change
CommunityAccept – invokes the Community Accept Flow
CommunityAssign – invokes the Community Assign Flow used when an asset is accepted
MultiTier_Tier1_Assign – invokes the Multi-Tier Flow used when an asset is accepted
MultiTier_NextTier_Assign – invokes the Multi-Tier Flow
ApproveTabAction – approves one or more tab
UnapproveTabAction – unapproves one or more tab

FIG. 25

SYSTEM AND METHOD FOR ASSET REGISTRATION WORKFLOWS UTILIZING AN EVENTING INFRASTRUCTURE IN A METADATA REPOSITORY

CLAIM OF PRIORITY

The present application claims the benefit of priority under 35 U.S.C. §119(e) to U.S. Provisional Patent Application No. 61/020,646 entitled "SYSTEM AND METHOD FOR ASSET REGISTRATION WORKFLOWS UTILIZING AN EVENTING INFRASTRUCTURE IN A METADATA REPOSITORY," filed on Jan. 11, 2008, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is related to Service-Oriented Architecture and service metadata repositories that store service metadata.

BACKGROUND

Service-Oriented Architecture (SOA) is based on the deconstruction of yesterday's monolithic applications and information technology infrastructure into a matrix of discrete, standards-based, network-accessible services. The process of transformation requires the organization, identification, and repurposing of applications and business processes of the existing information technology infrastructure. The transformation to SOA begins with an analysis of the IT infrastructure to identify applications, business processes, and other software assets that become services, or otherwise support the SOA.

SUMMARY OF THE INVENTION

Described herein is a system and method for automating asset registration workflows in a service metadata repository. Workflows are automated based on rules configured in an XML file. Automated workflows include accepting assets, assigning assets, and registering assets based on types, communities, or projects. Automatic timers track and send reminders for registration status and expiration status. Workflows can intercept metadata changes, take pre-defined actions, and can be customized to handle state changes. Events are filtered using rules and delivered in a reliable, scalable, clustered fashion to pre-defined business process management web service endpoints.

BRIEF DESCRIPTION OF THE DRAWINGS

FIG. 6 illustrates an example of wiring asset events to flows, in accordance with one embodiment.

FIG. 25 illustrates metadata change flows, in accordance with one embodiment.

DETAILED DESCRIPTION

Figure 1:
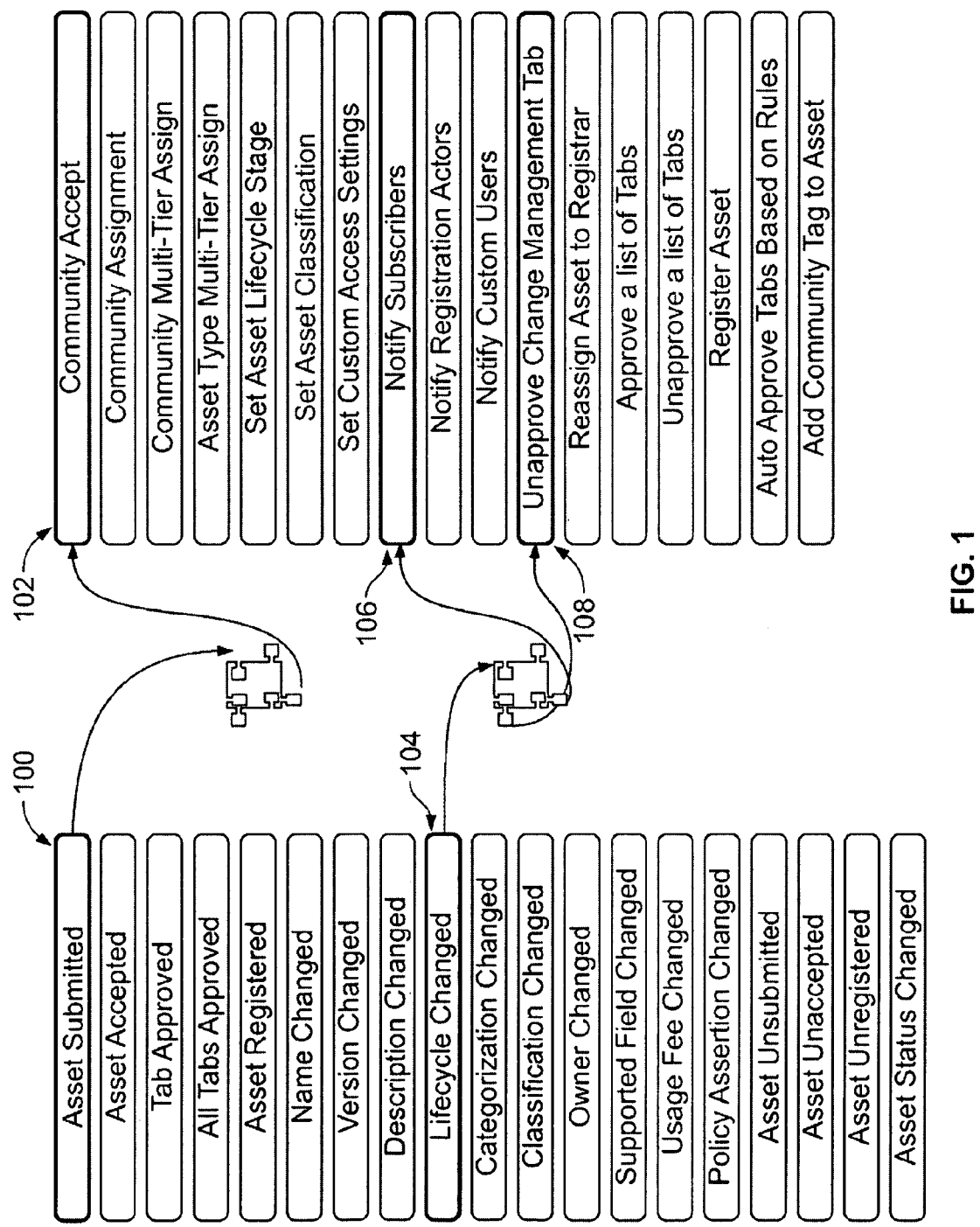
FIG. 1 illustrates wiring events to workflows, in accordance with one embodiment.

Metadata is data about data, or more specifically, information about the content of the data; service metadata is information about the services in an SOA. Service producers use service metadata to describe what service consumers need to know to interact with the service producers. Service metadata is stored in a metadata repository by service producers and then accessed by service consumers. A metadata repository provides visibility into the portfolio of assets, the traceability of the assets within that portfolio, the relationships and interdependencies that connect the assets to each other, the policies that govern use of the assets, and the projects that produce the assets and consume the assets.

It is not enough to simply put reusable service metadata assets into a metadata repository. There are additional problems with service metadata reuse. Determining whether the assets have sufficient quality is a difficult problem. A further difficulty is how to ensure that the right people receive the right assets.

Previously, service metadata repositories relied upon human users to review assets for quality. Administrators (sometimes called registrars) determined whether the right people were assigned to review the right assets. The human user reviewed the asset manually, assigned the asset to a domain expert for review of the content, and after approval, the asset was moved to registered status. Users could then access the registered asset. In some cases, half a dozen different domain experts might be involved in the approval decisions at different stages. For example, an architect might need to approve a WSDL asset before a subsequent approval by a documentation expert. This potentially results in a large number of manual steps in the review and approval process that must be performed by the administrator or registrar.

The solution is to wire events to workflows. Whenever an action occurs in the metadata repository, an event is generated. For example, when a field is changed, subscribers to that field are notified. Depending on the kind of service metadata, the workflows automatically assign the assets to the appropriate domain experts without requiring human action in the assignment process.

Business process management (BPM) helps organizations ensure that business processes are optimally defined, managed, executed, and monitored. Automating processes that bridge systems and people can reduce delays, inefficiencies, errors, and bottlenecks associated with manual handoffs. The XML Process Definition Language (XPDL) is a format standardized by the Workflow Management Coalition to interchange Business Process definitions between different workflow products like modeling tools and workflow engines. XPDL defines an XML schema for specifying the declarative part of workflow.

In accordance with one embodiment, events are stored in a Java Message Service (JMS) store because a process engine may not be on-line at all times. JMS is useful for event-based systems because it provides for reliability of events, scalability and performance, event filtering and expiration, and multi-cast of events.

Eventing Infrastructure Architecture

The Eventing Infrastructure provides a framework where events can be pumped in at a high rate and it provides the following set of services: an event model based on an XML Schema that is extensible where domain specific metadata can be plugged; storage of the events to a persistence store for reliability with first class support to JMS, DB and pluggable extensions for additional stores; a subscription service to subscribe to interested events and registration of web service endpoints where the matched events will be delivered; an internal delivery service that matches the incoming events to each subscribed Endpoint and delivers the filtered events to an internal notification service; and a notification service that notifies the registered Endpoint using SOAP/HTTP with pluggable extensions to additional transport protocols such as SOAP/JMS.

High Level Architecture Considerations

The following scenarios are considered when the eventing infrastructure is architected keeping all the corner cases in the loop. When an approach is selected, there are pros and cons in that approach but an option is selected based on weighing both the pros and cons.

Architecture

FIG. 1 illustrates wiring events in a service metadata repository to workflows in a process engine, in accordance with one embodiment. Asset lifecycle events are depicted in the left hand column, including asset submitted 100 and lifecycle changed 104. Automated workflows that will be executed upon receiving asset lifecycle event information are depicted in the right hand column, including community accept 102, notify subscribers 106, and Unapprove Change Management Tab 108. In one embodiment, when an asset submitted 100 event is generated in a service metadata repository, a community accepts 102 automated workflow is executed to determine if the community accepts the asset. In one embodiment, when a lifecycle changed 104 event is generated, a notify subscribers 106 workflow and an unapproved change management tab workflow are automatically executed in a process engine. In accordance with an embodiment, FIG. 25 shows additional service metadata repository events that can be wired to workflows in a process engine. Available metadata change events or states 2500 are illustrated. Also shown are available work flows 2502 that can be wired to actions or events.

Figure 2:
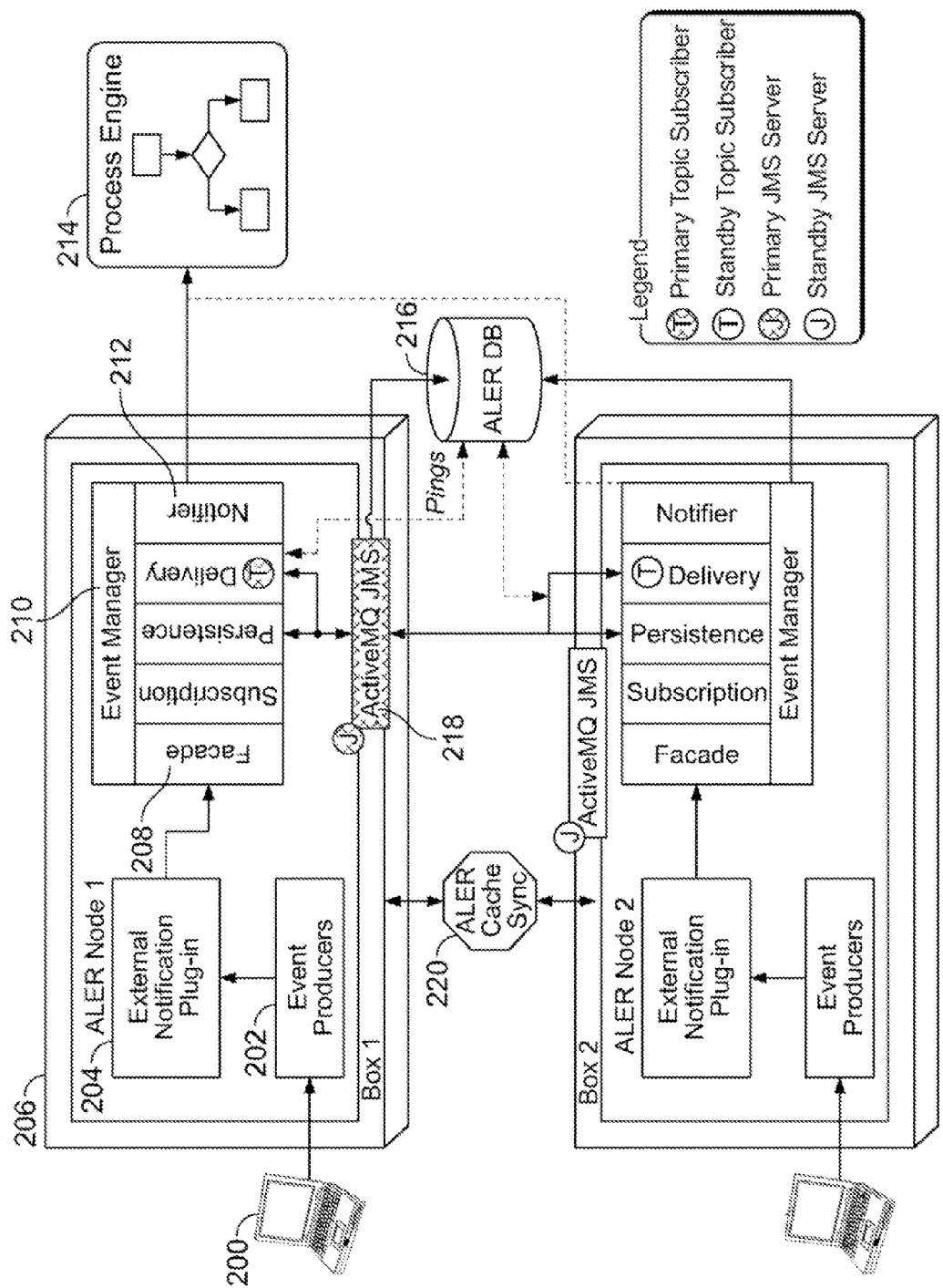
FIG. 2 illustrates a system architecture diagram, in accordance with one embodiment.

FIG. 2 illustrates a system architecture diagram, in accordance with one embodiment. User 200 uses a browser to communicate to a service metadata repository, making a change to an asset that causes an event to be produced 202. Event information is passed through the external notification plug-in on enterprise repository (ER) node 1 206. The event information passes through the event manager 210, which provides façade, subscription, persistence, delivery, and notification services. From the notifier 212, the event information is passed to the process engine 214, where automated workflows process the event information. In one embodiment, multiple repository nodes are clustered and use a single repository database 216. In one embodiment, Java Message Service (JMS) 218 is used to maintain clustering between a JMS server on the primary server and a JMS server on the standby server. The clustered repository nodes use a single cache 220 to synchronize information between a primary node, box 1, and a standby node, box 2. In one embodiment, clustering is implemented by the metadata repository without the need for external clustering hardware or software.

Figure 3:
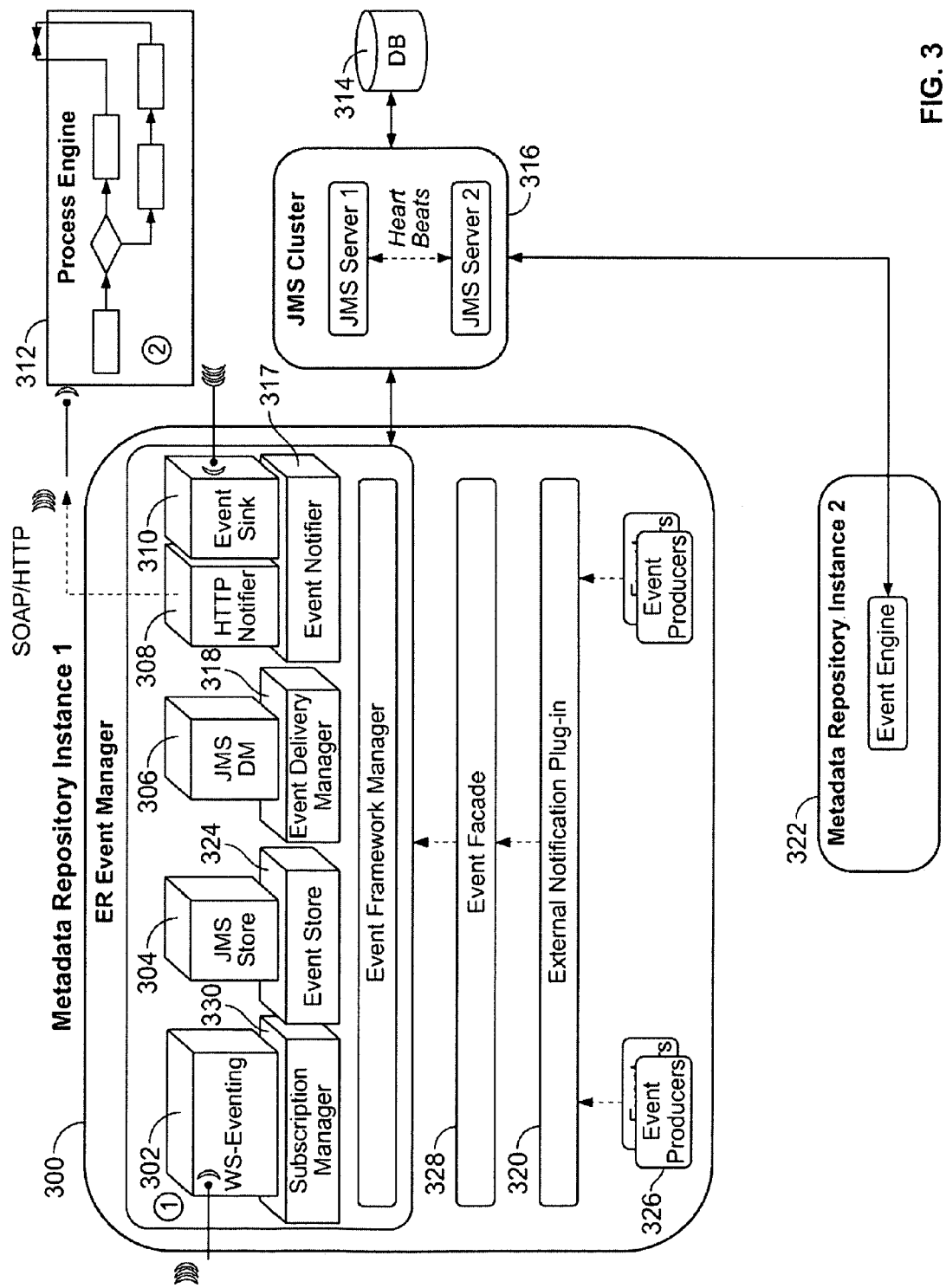
FIG. 3 illustrates a system architecture diagram, in accordance with one embodiment.

FIG. 3 illustrates an architecture diagram for one embodiment of advanced registration flows. Metadata repository 300 includes an event manager that itself includes WS-Eventing 302 for generating events, Java Message Store (JMS) Store 304 and event store 324 for storing events, JMS Delivery Manager (DM) 306 and event delivery manager 318 for delivering events, event notifier 317 and http notifier 308 for notifying subscribed services of events, and event sink 310. Subscription manager 330 maintains subscriptions for listeners to subscribe to events. Event producers 326 send information that generates the event through an external notification plug-in 320 through the event façade 328 into the event manager. Automated workflows that use the information contained in the event are executed by process engine 312. In one embodiment, the metadata repository 300 supports clustering of the JMS server 316 to support a second metadata repository instance 322 without need for external clustering software or hardware. In one embodiment, persisted events are stored in database 314.

Figure 4:
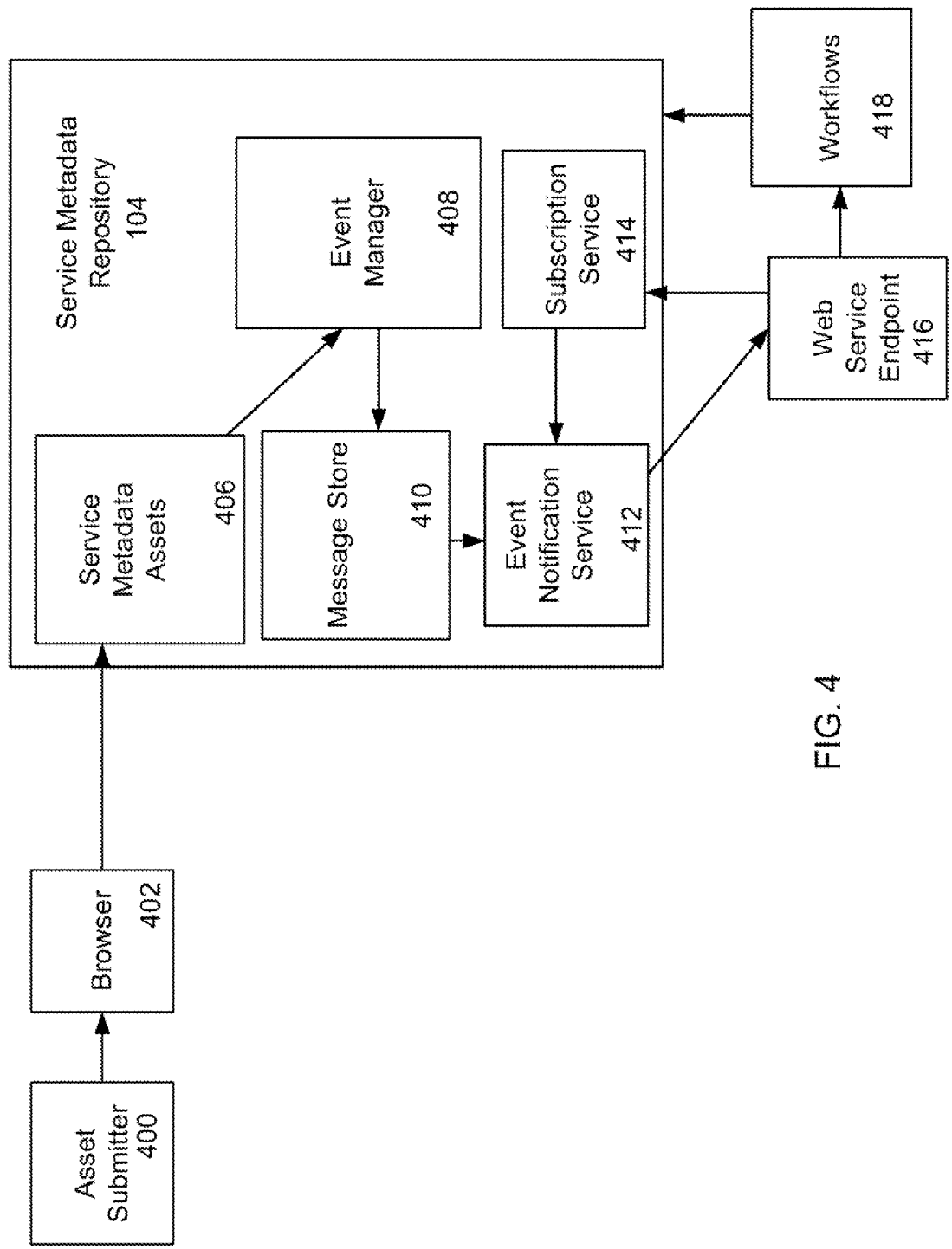
FIG. 4 illustrates a system architecture diagram, in accordance with one embodiment.

FIG. 4 illustrates a system architecture diagram, in accordance with one embodiment. Asset submitter 400 submits a service metadata asset 406 into service metadata repository 404 via browser 402. An event is generated and managed by event manager 408. The event is persisted in message store 410. In one embodiment, message store 410 is a Java Message Service (JMS) message store. Event notification service 412 notifies web service endpoint 416 which had previously subscribed to this type of event via registration with subscription service 414. The event information is passed to one or more workflows 418 for automated processing. In one embodiment, the automated workflows are executed by a business process management engine. In one embodiment, the workflows may require additional steps to be performed by additional participants and/or components.

Figure 5:
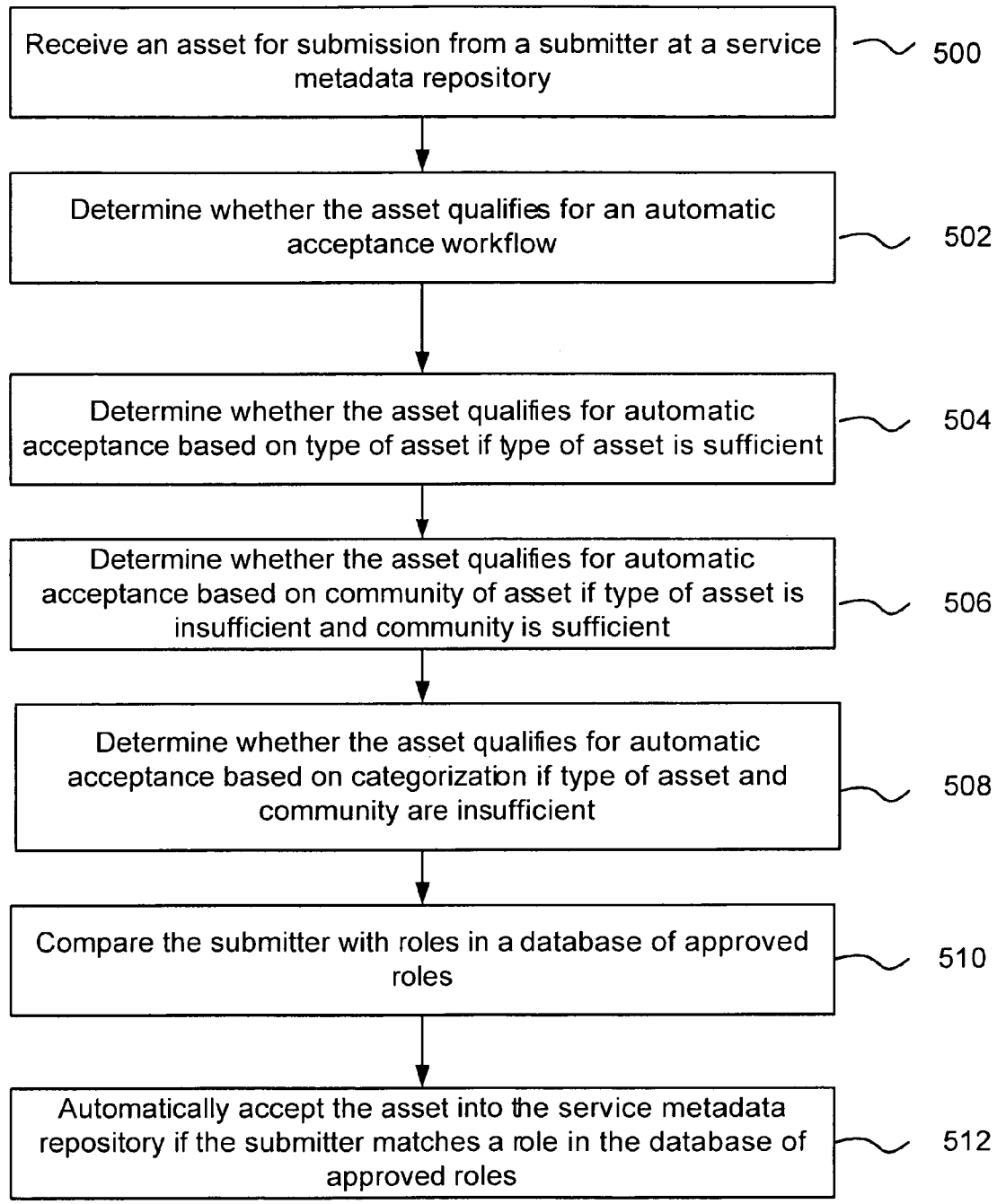
FIG. 5 illustrates a flowchart for a method, in accordance with one embodiment.

FIG. 5 illustrates a flowchart for a method, in accordance with one embodiment. In step 500, an asset is received for submission from a submitter at a service metadata repository. In step 502, it is determined whether the asset qualifies for an automatic acceptance workflow. In step 504, it is determined whether the asset qualifies for automatic acceptance based on type of asset if type of asset is sufficient. In step 506, it is determined whether the asset qualifies for automatic acceptance based on community of asset if type of asset is insufficient and community is sufficient for the determining. In step 508, it is determined whether the asset qualifies for automatic acceptance based on categorization if type of asset and community are insufficient for the determining. In step 510, the submitter is compared with roles in a database of approved roles. In step 512, the asset is automatically accepted into the service metadata repository if the submitter matches a role in the database of approved roles.

Figure 7A:
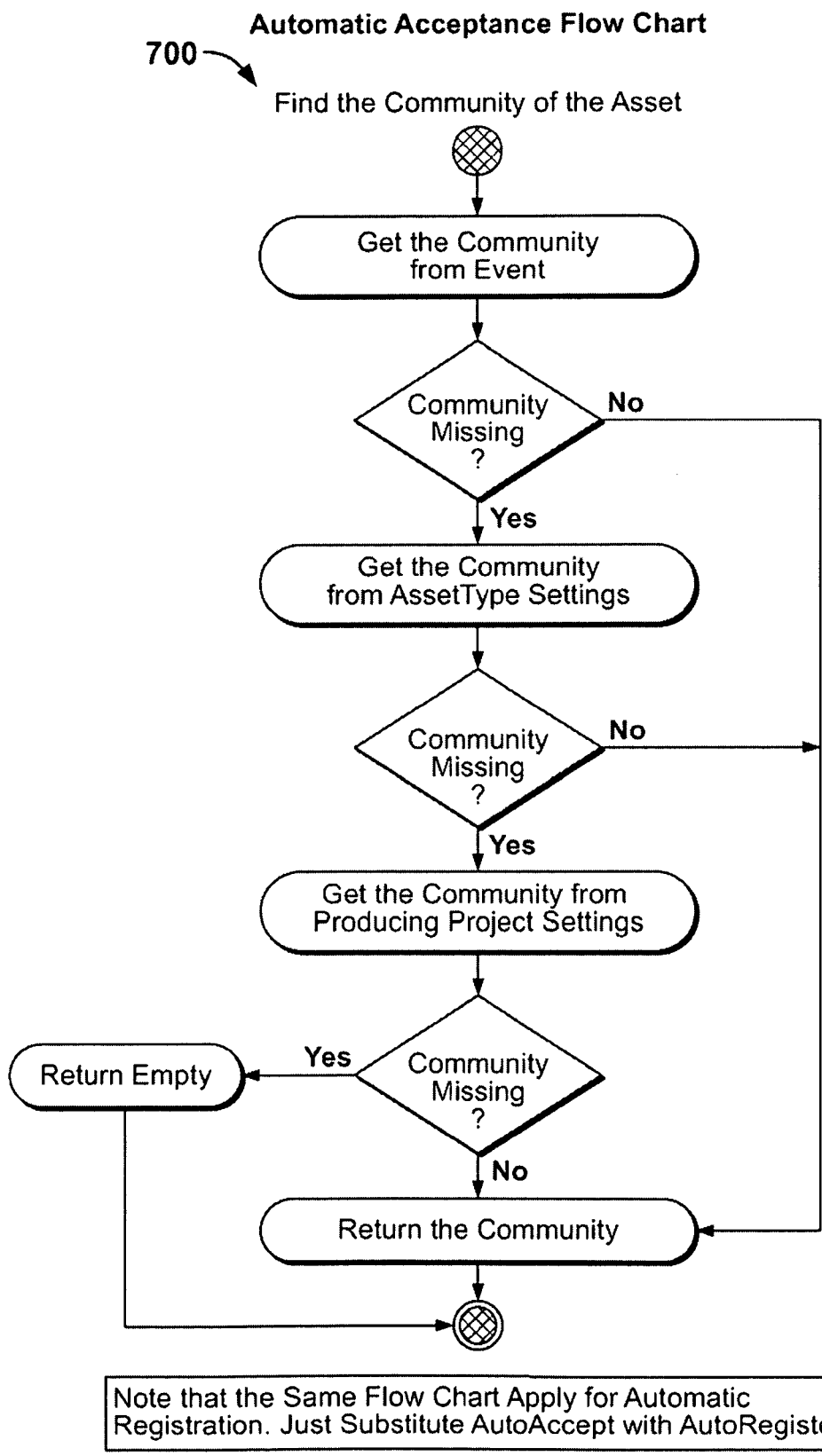
FIGS. 7A-7B illustrate a community flow chart, in accordance with one embodiment.
Figure 7B:
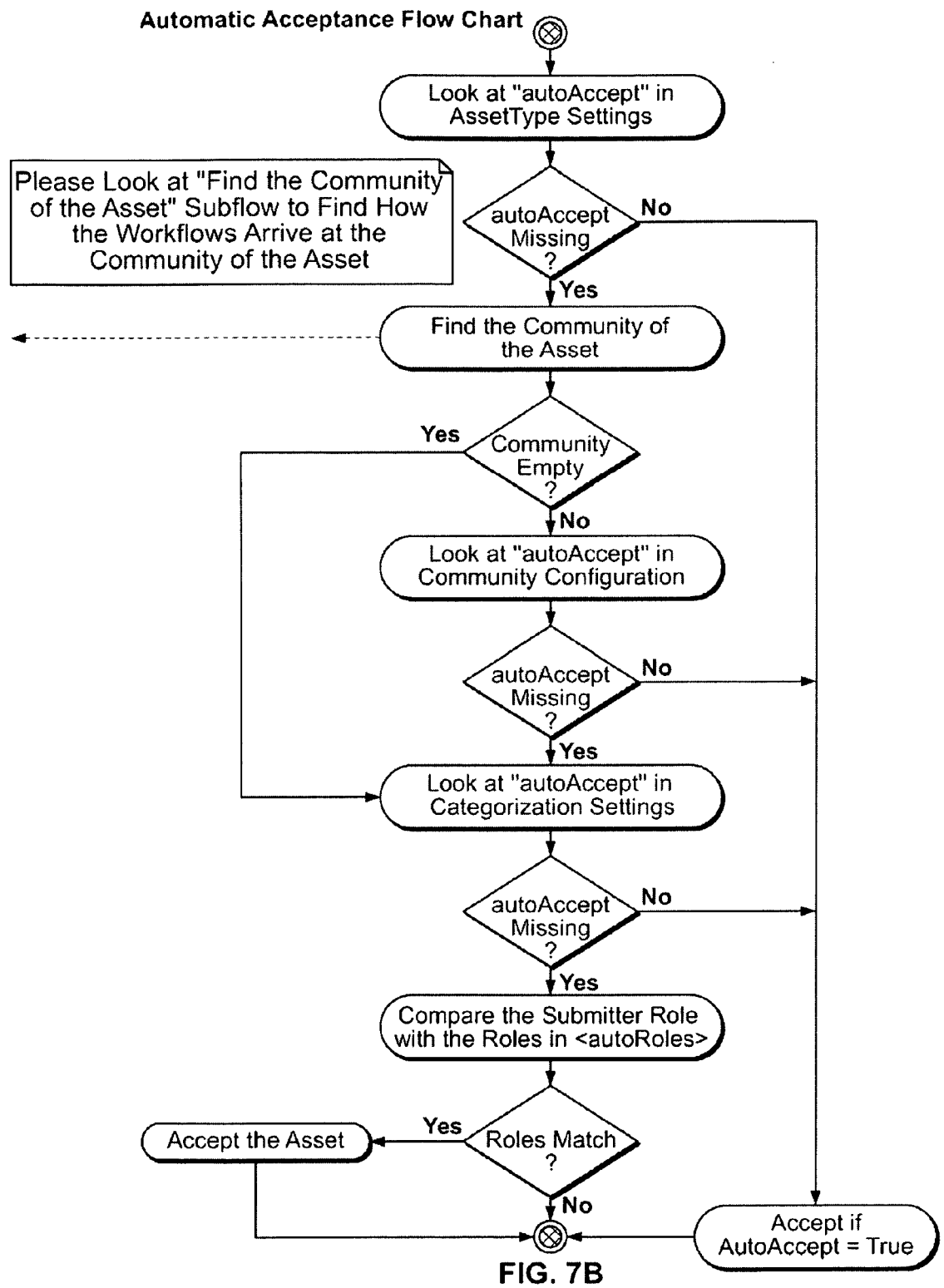
Figure 8A:
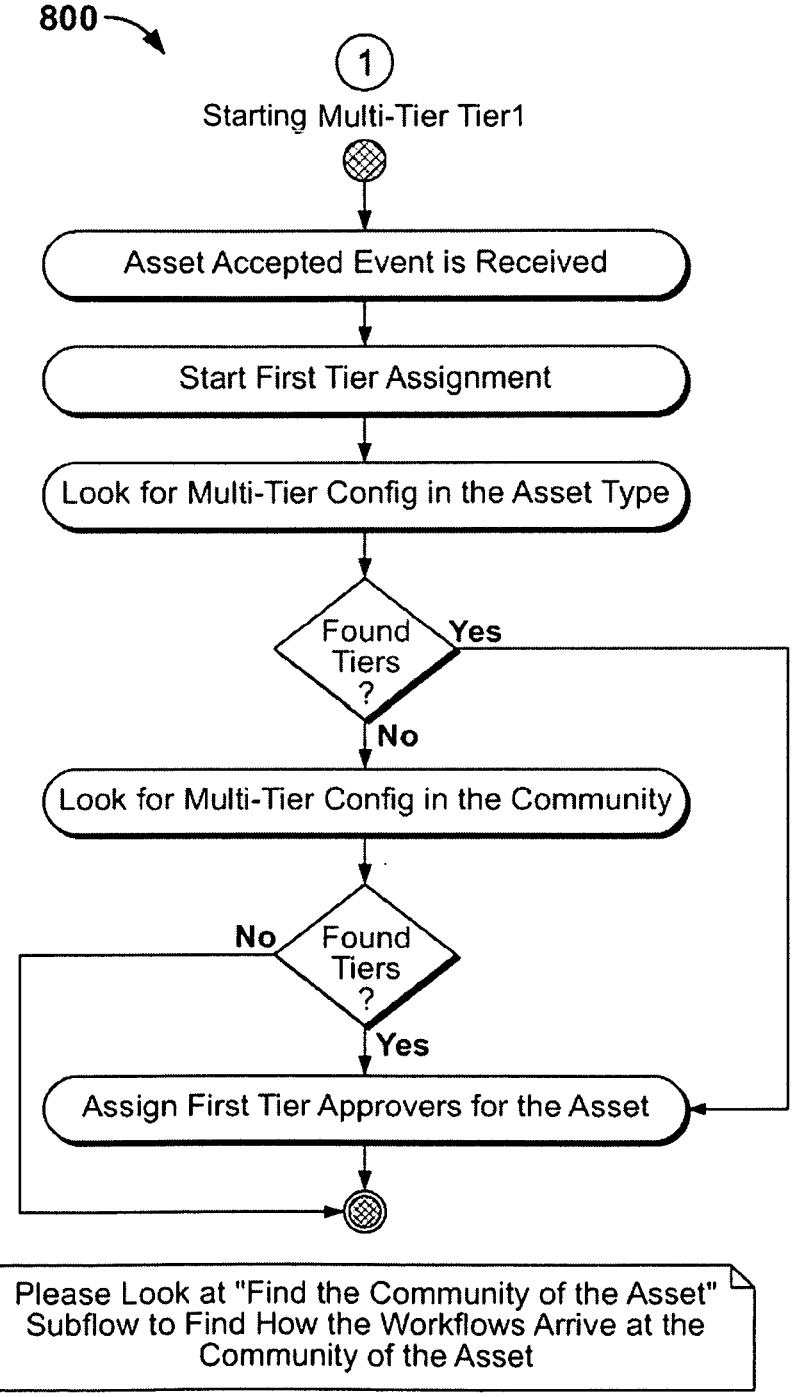
FIGS. 8A-8B illustrate a multi-tier flow chart, in accordance with one embodiment.
Figure 8B:
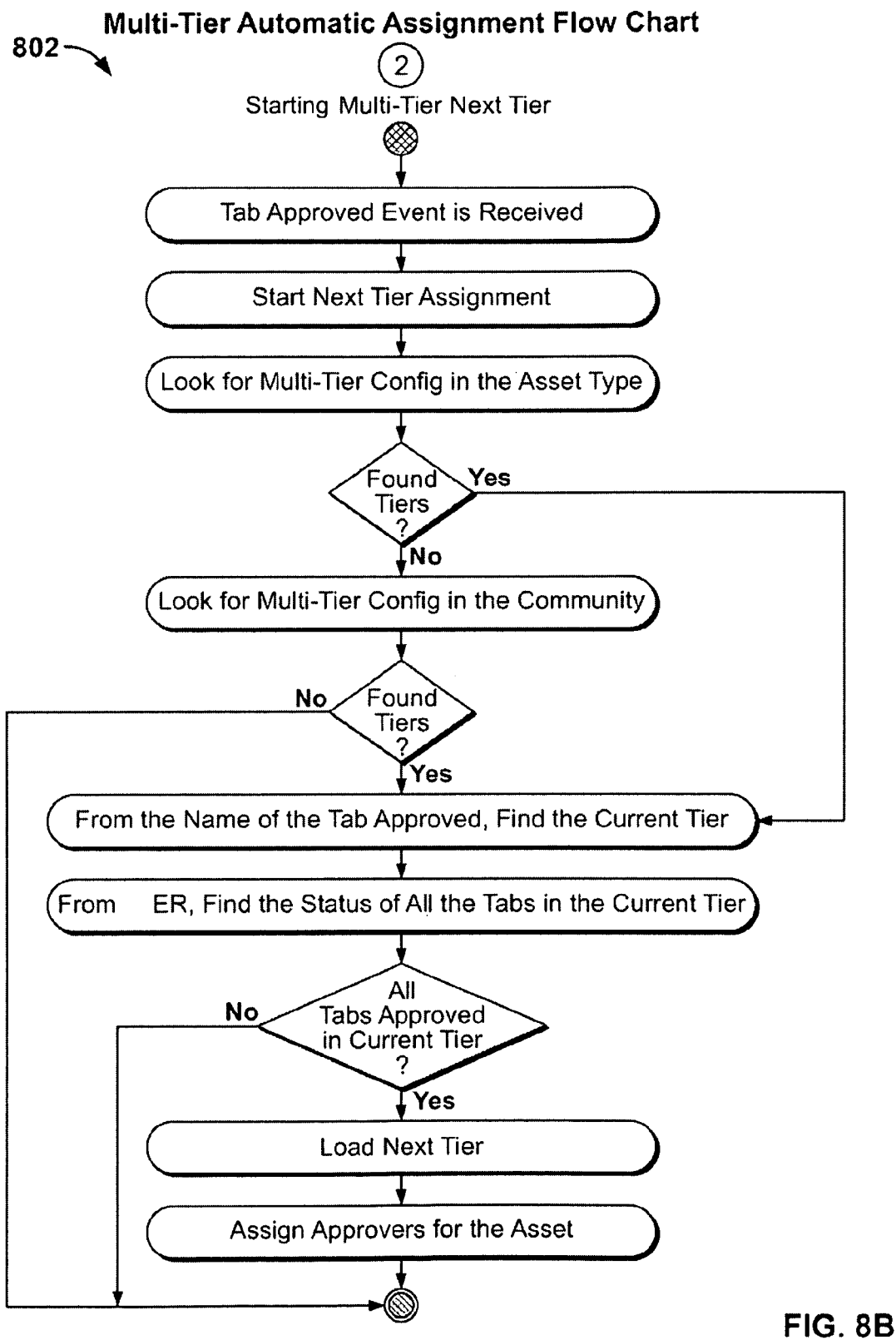
Figure 9:
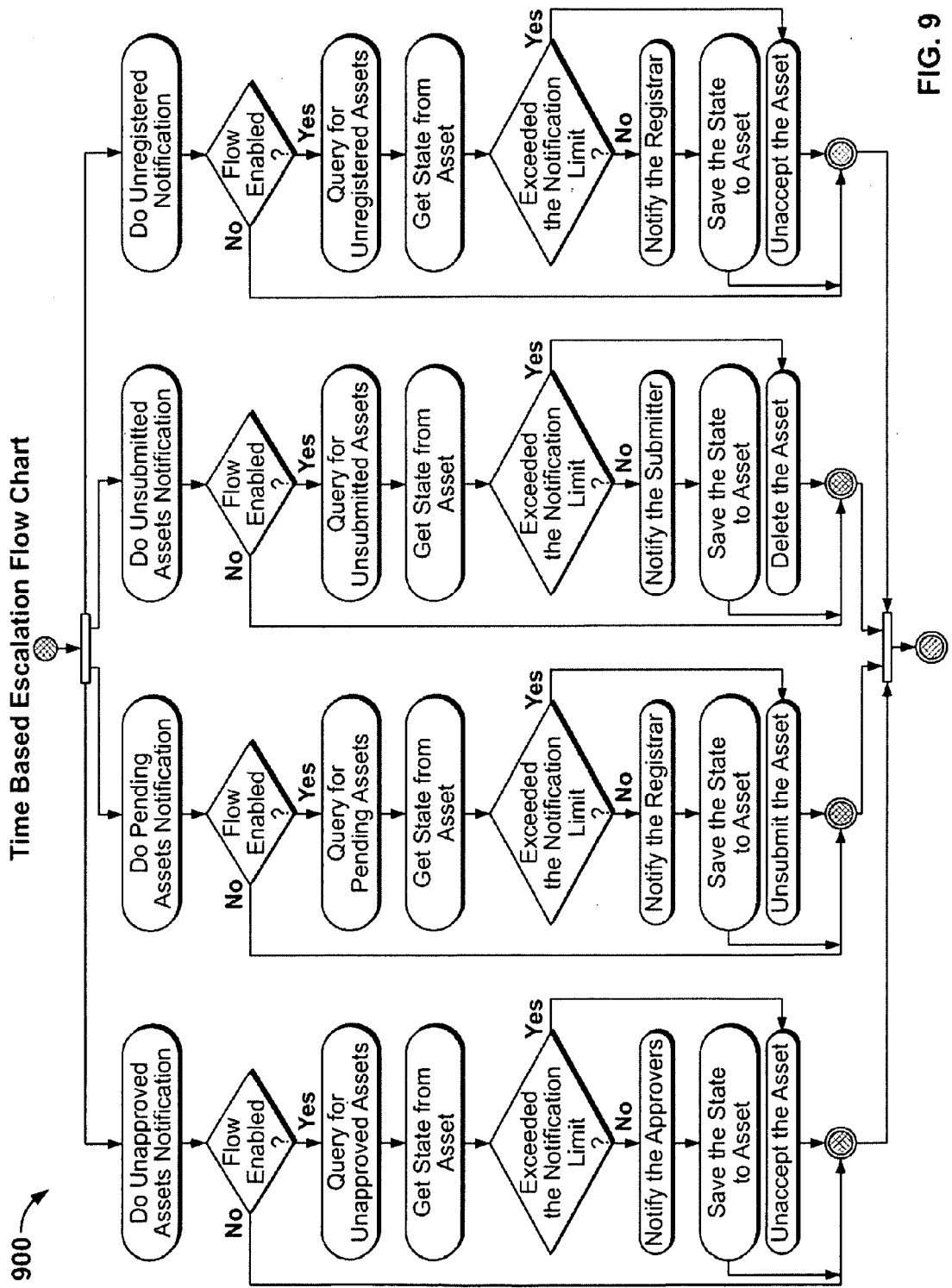
FIG. 9 illustrates a time based escalation flow chart, in accordance with one embodiment.
Figure 10:
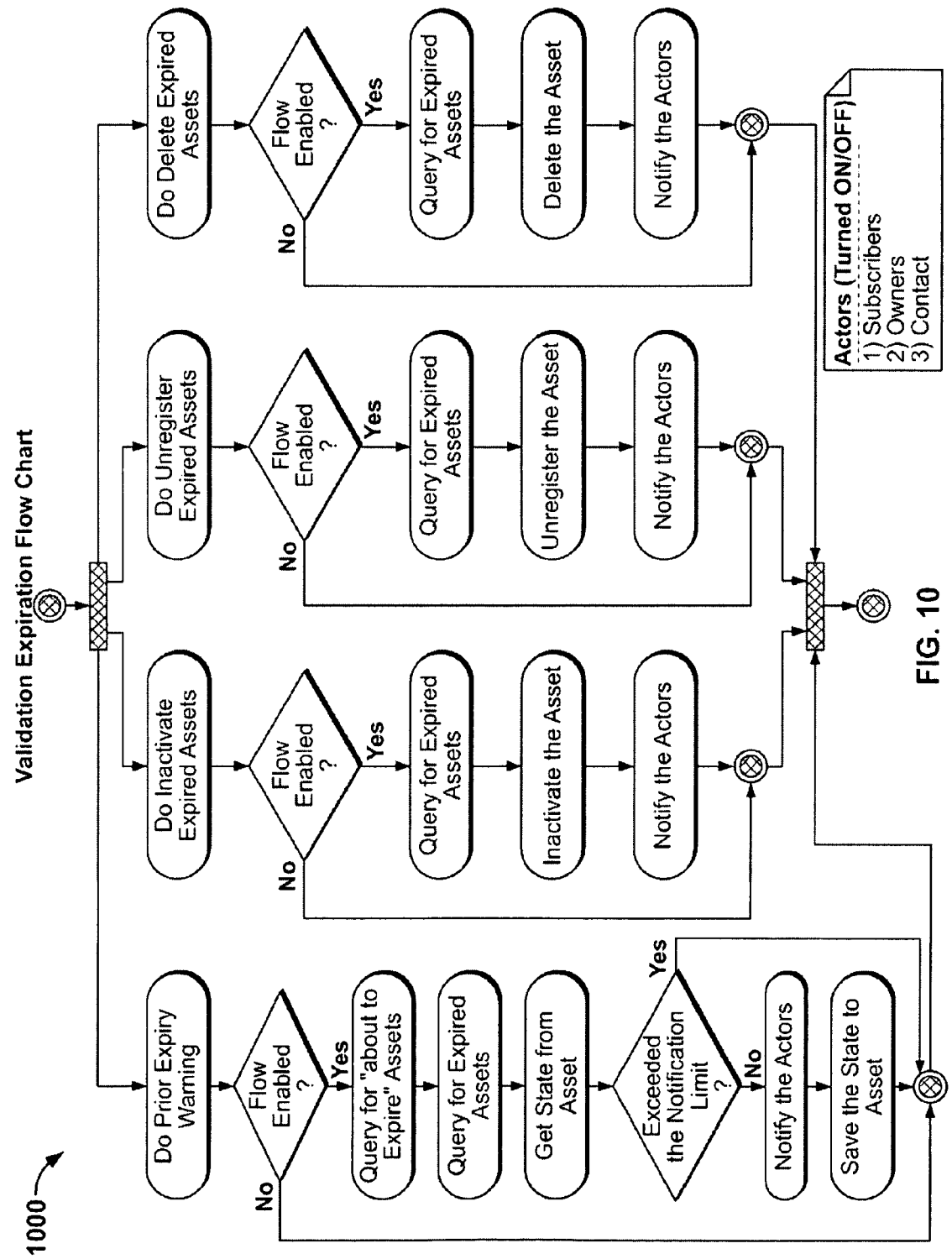
FIG. 10 illustrates a validation expiration flow chart, in accordance with one embodiment.

FIG. 6 illustrates an XML file 600 associating event information with workflows, in accordance with one embodiment. In one embodiment, the Asset Submission event is associated with the Community Accept workflow. FIGS. 7A and 7B illustrates a flow chart for a workflow for automatic acceptance of an asset, in accordance with one embodiment. Finding a community 700 associated with an asset is used to determine whether to automatically accept a submitted asset. The same flow chart can be used with a workflow for automatic registration of an asset. FIGS. 8A and 8B illustrates a flow chart for a work flow for multi-tier automatic assignment, in accordance with one embodiment. When multiple tiers of approvers are assigned to an asset, the automated workflow first assigns tier 1 approvers 800. Then after first tier approvers approve the asset, the next tier of approvers 802 are assigned to the asset. FIG. 9 illustrates a flow chart for a work flow for time based escalation, in accordance with one embodiment. After a certain period of time 900, automatic notifications are generated for unapproved assets, pending assets, unsubmitted assets, and unregistered assets. FIG. 10 illustrates a flow chart for a validation expiration work flow. After a sufficient period of time has expired 1000, automatic notifications are sent prior to the expiration, and then expired assets are subsequently inactivated, unregistered, and deleted.

Figure 11:
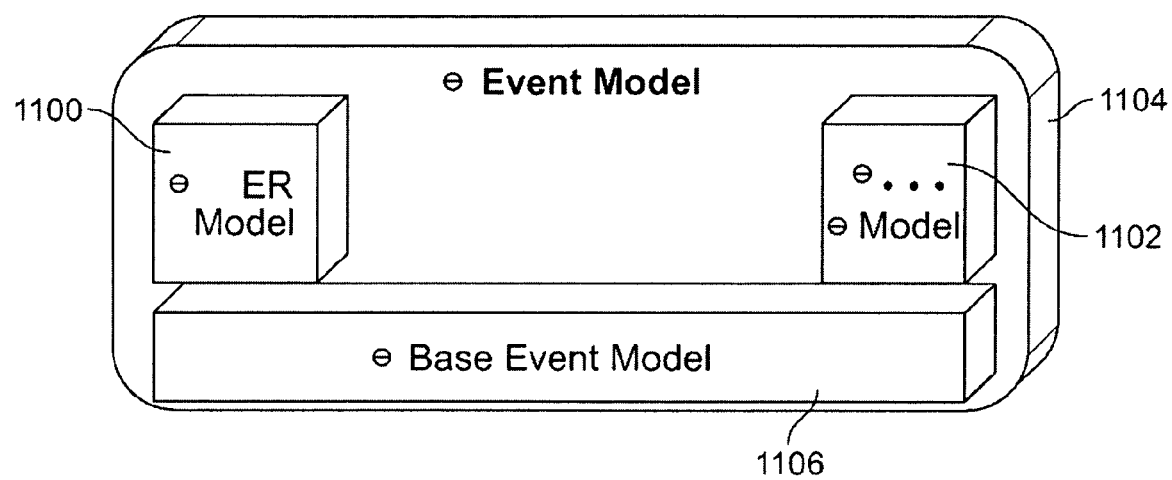
FIG. 11 illustrates an event model, in accordance with one embodiment.
Figure 12:
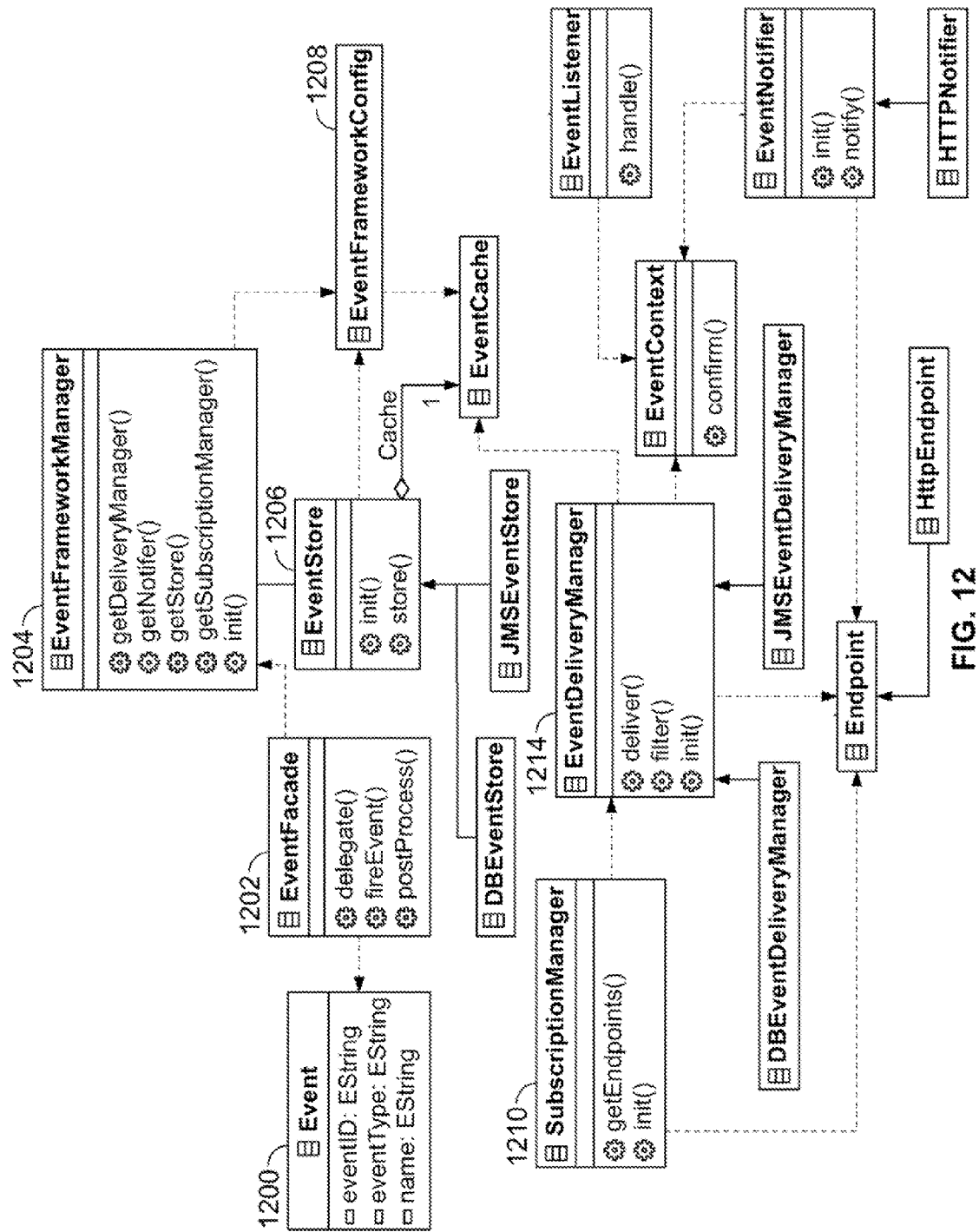
FIG. 12 illustrates a class diagram, in accordance with one embodiment.
Figure 13:
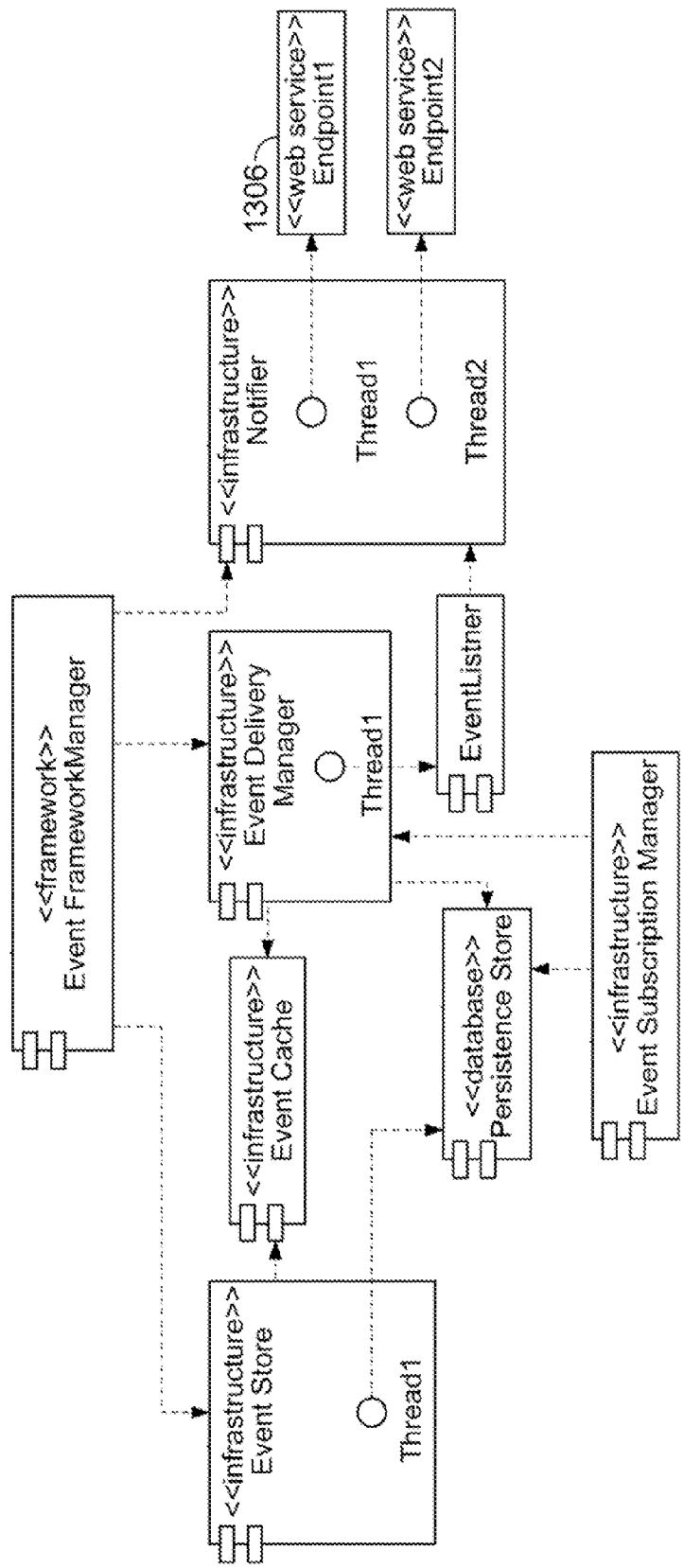
FIG. 13 illustrates a component diagram, in accordance with one embodiment.
Figure 14:
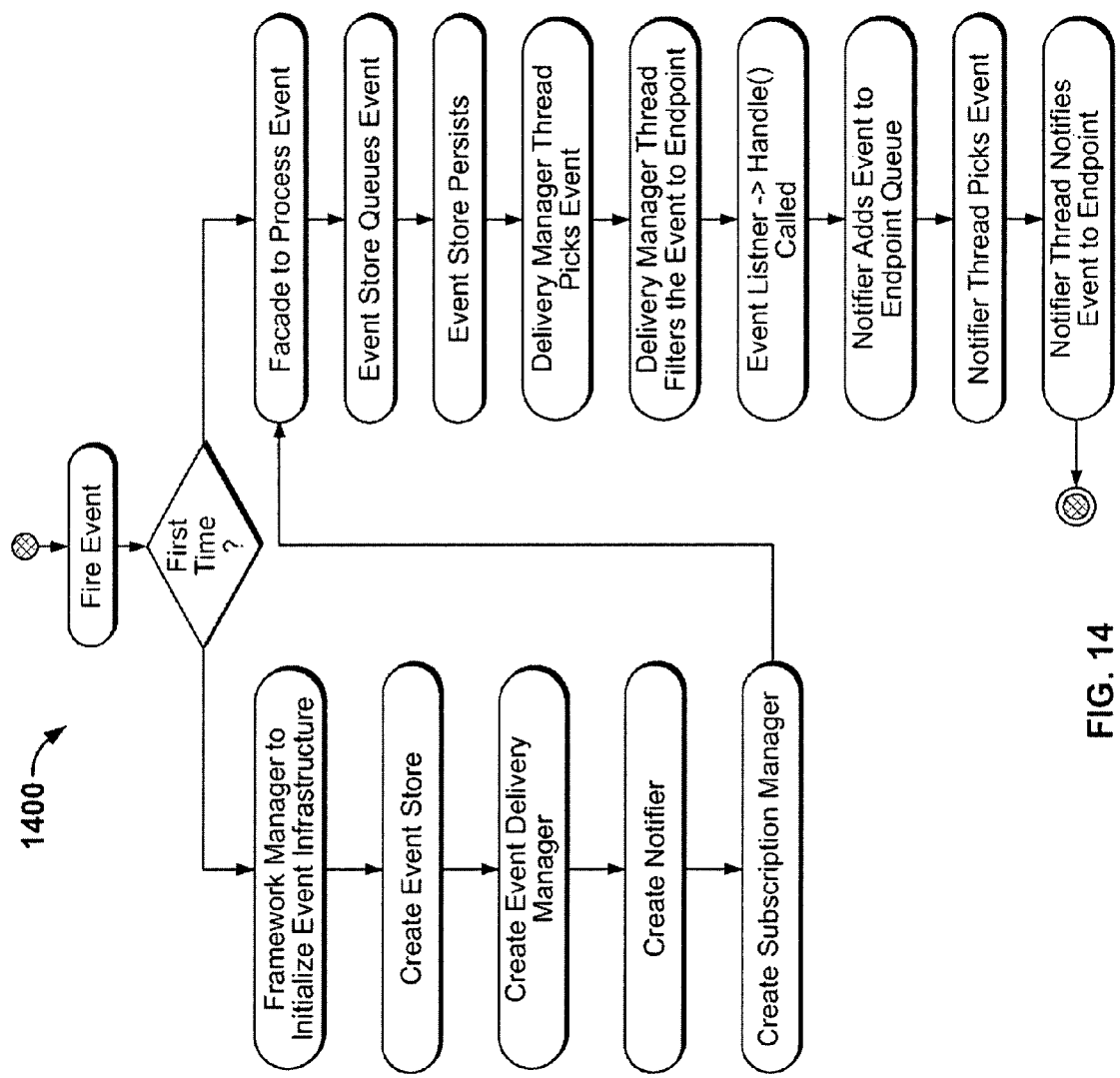
FIG. 14 illustrates an activity diagram, in accordance with one embodiment.

FIG. 11 illustrates high level view 1104 of the class hierarchy for an event model, with a base event model 1106, and event models 1100 and 1102 that extend from the base event model 1106. FIG. 12 is a class diagram depicting the class hierarchy for the Event Framework Manager in one embodiment. FIG. 13 is a component diagram that shows the different components involved in the Event Infrastructure and how they are related to each other in one embodiment. FIG. 14 is an activity diagram that shows the typical flow of execution involved when using the Event Infrastructure in one embodiment. The Event Façade 1202 acts as a glue layer between the Event Infrastructure (all the components of FIG. 13 except for 1306) and the Event Infrastructure client. It exposes a method to fire an event 1200 to the Event Infrastructure and does pre-processing of the Event before it is passed to Event Infrastructure. The Event Framework Manager 1204 manages the Event Infrastructure and acts as an entry point to the Event Façade 1202. The Event Framework Manager 1204 maintains a pointer to Event Store 1206, Event Framework Config 1208, etc. For example, which Store can be used, JMS or DB by the EventStore 1206, will be decided by the Event Framework Manager 1204 based on the Event Framework Config 1208. When the Event Infrastructure is initialized, the Event Framework Manager 1204 creates the Event Store 1206, Event Delivery Manager 1214, Event Notifier, Event Subscription Manager 1210, etc. As shown in FIG. 14, the Event Framework Manager will call init ( ) 1400 method of all the components after they are instantiated and kick off a series of initialization where threads will be created by the individual components when they are initialized. Event Infrastructure configuration information, including the type of Event Stores, is maintained by the Event Framework Config object 1208. The Event Store 1206 is responsible for storing the Events in a persistence store so that the events can be reliably delivered. The Event Store 1206 can store the events temporarily in a cache and persist the events in a batch for performance reasons. However, this option can be tuned as to the size of the batch, etc.

Figure 22:
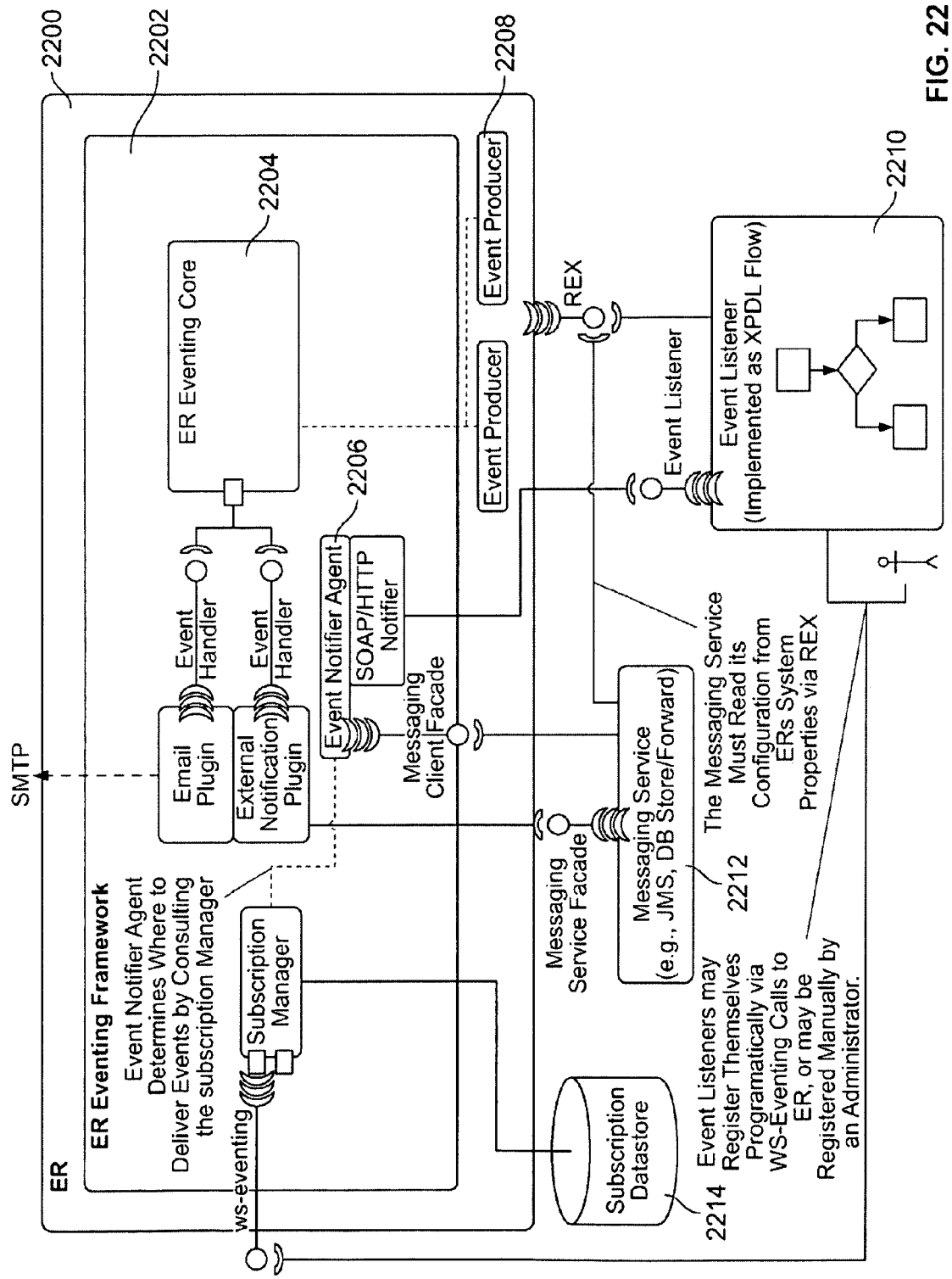
FIG. 22 illustrates an eventing framework, an event listener implemented as an XPDL flow, a messaging service, a messaging service façade, and a subscription data store, in accordance with one embodiment.

In accordance with an embodiment, FIG. 22 illustrates a system architecture for one embodiment. An enterprise repository (ER) 2200 contains an eventing framework 2202 which includes an eventing core 2204 which handles events produced by event producer 2208. In one embodiment, events could be asset submissions, registrations, changes, or any other lifecycle event that affects an asset in a service metadata repository or enterprise repository. An event notifier agent 2206 determines where to deliver events by consulting the subscription manager. The Event Delivery Manager is responsible for delegating the events to the Event Notifier. The Event Notifier implements the EventListener interface and implements the handle (Event ev, Endpoint ep) method. This handler is then registered with the Event Delivery Manager. The Event Delivery Manager is also responsible to work with the Subscription Manager and figures out which Endpoint this event belonged to. The subscription manager stores subscriptions in the subscription datastore 2214. The event and the Endpoint object are then passed to the Event Notifier. For each Endpoint, a JMS Durable Topic Subscriber will be created by the JMS Event Delivery Manager, which is provided by messaging service 2212. In one embodiment, the messaging service 2212 reads configuration information from the metadata repository using an repository extension API (application programming interface). All the events will be received by each of the Topic Subscribers and the delivery manager will filter the events based on the subscriptions. When an event doesn't belong to an Endpoint, the JMS message will be immediately confirmed. If not, the event will be delivered to the remote endpoint 2210 by the Notifier and will be confirmed only after the notifier confirms the event. The Event Notifier is responsible for notifying the event to the remote Endpoint. In one embodiment, the remote endpoint web service 2210 is an event listener and is implemented as an XPDL work flow in a process engine. In one embodiment, the event notifier may have one thread per endpoint and one queue per endpoint where events are queued. When the handles method of EventListener is called, the events will be queued to the right Endpoint. The notifier will confirm the event as soon as the Event is delivered to the remote endpoint via EventContext so that EventStore can remove the event from the store. When the Notifier is initialized, it will be passed with an array of Endpoint objects that represent each of the remote Endpoints. The Event Subscription Manager is responsible for managing the Event Subscriptions where Endpoints are registered for interested events. It also works with Event Delivery Manager and provides it with the Endpoint information.

JMS Ordering and Clustering Considerations

Figure 23:
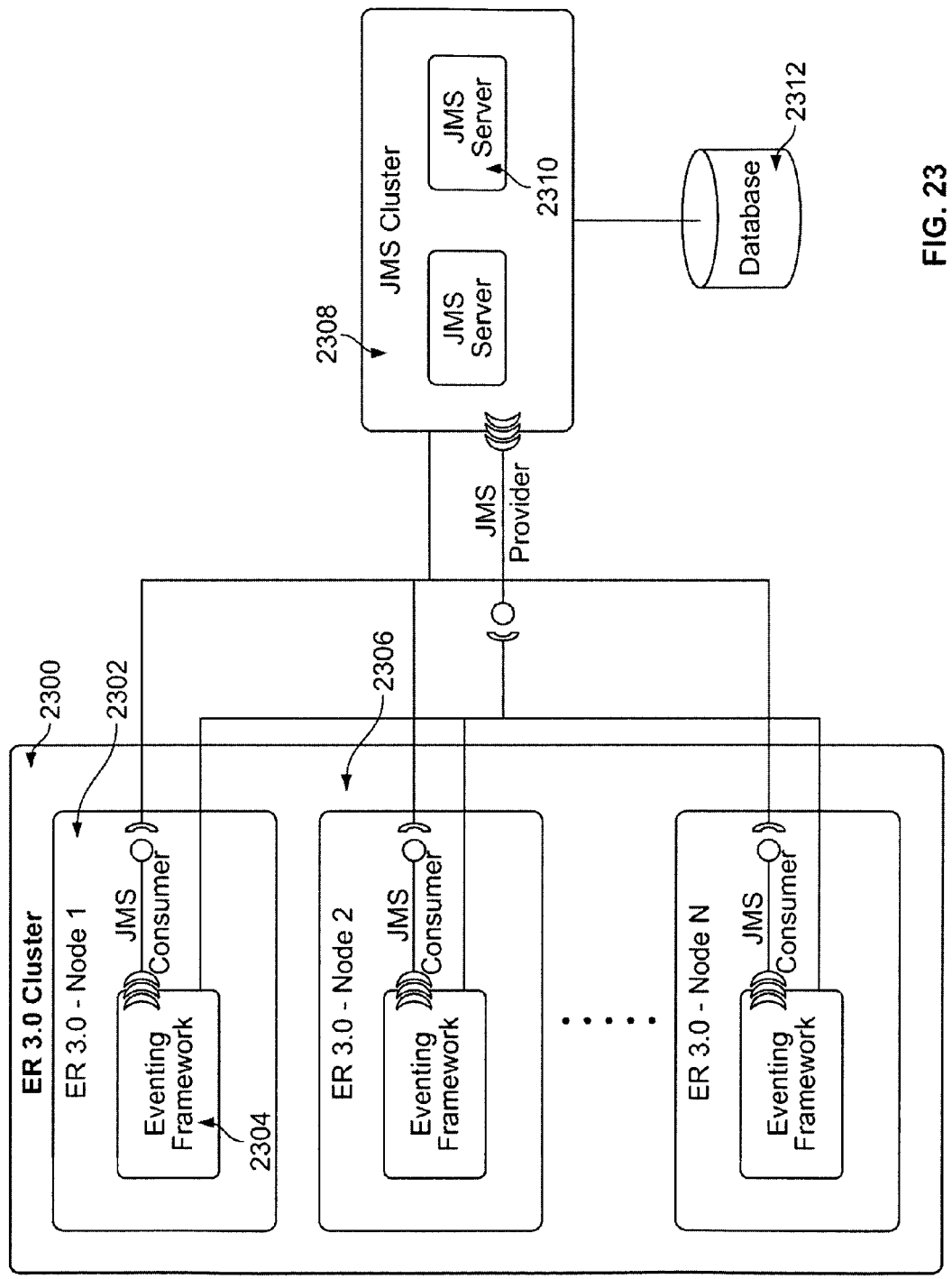
FIG. 23 illustrates clustering the metadata repository with the JMS server, in accordance with one embodiment.

In accordance with an embodiment, FIG. 23 illustrates a repository cluster 2300 that includes a plurality of metadata repository nodes. An enterprise repository (ER) or service metadata repository node 2302 contains an instance of an eventing framework 2304 which is a JMS (Java Message Service) consumer. Repository node 2306 also contains an instance of the eventing framework and is a JMS consumer. JMS Cluster 2308 includes one or more JMS servers 2310 to provide JMS services to the JMS consumers. JMS event messages are persisted in database 2312.

In one scenario, two metadata repository nodes are configured in a clustered environment with the eventing infrastructure embedded inside a metadata repository instance. Each piece of the eventing infrastructure will use a JMS Queue listener to pick up a stored event and the event is delivered to the remote endpoint via the notifier. In one embodiment, each of the metadata repository clustered nodes will create events which will be handled by the eventing infrastructure. Since JMS queues are used, the JMS server will load balance the events. There are two potential issues that may impact the ordering: Issue 1: one event E1 produced before another event E2 may end up late to the JMS Server because of TCP delays; Issue 2: assuming that the events arrive in the right order, since the events are load balanced, the JMS server may take E1 and give it to Node1's JMS listener and take E2 and give it to Node2's JMS listener. If Node1 and Node2 are delivering events to the same endpoint, then ordering may not be guaranteed because of the TCP delays over HTTP. Issue 1 may be a difficult problem to solve since the events may be unrelated and the timestamp cannot be relied on. This issue can be best addressed by relying on application level IDs that are added to the events by the application layer. Issue 2 can be resolved by having one node deliver the events exclusively to one remote endpoint. In one embodiment, one metadata repository node's eventing infrastructure delivers to only one remote endpoint by ensuring that all the nodes talk to each other (using internal JMS topic broad-cast) and establish a neighbor list. Then they elect themselves to share endpoints and JMS durable topics can be used. In one embodiment, a JMS server allows only one durable subscriber with the same name across the JMS Server. This will essentially make one node gain an exclusive lock over a remote endpoint.

Figure 24:
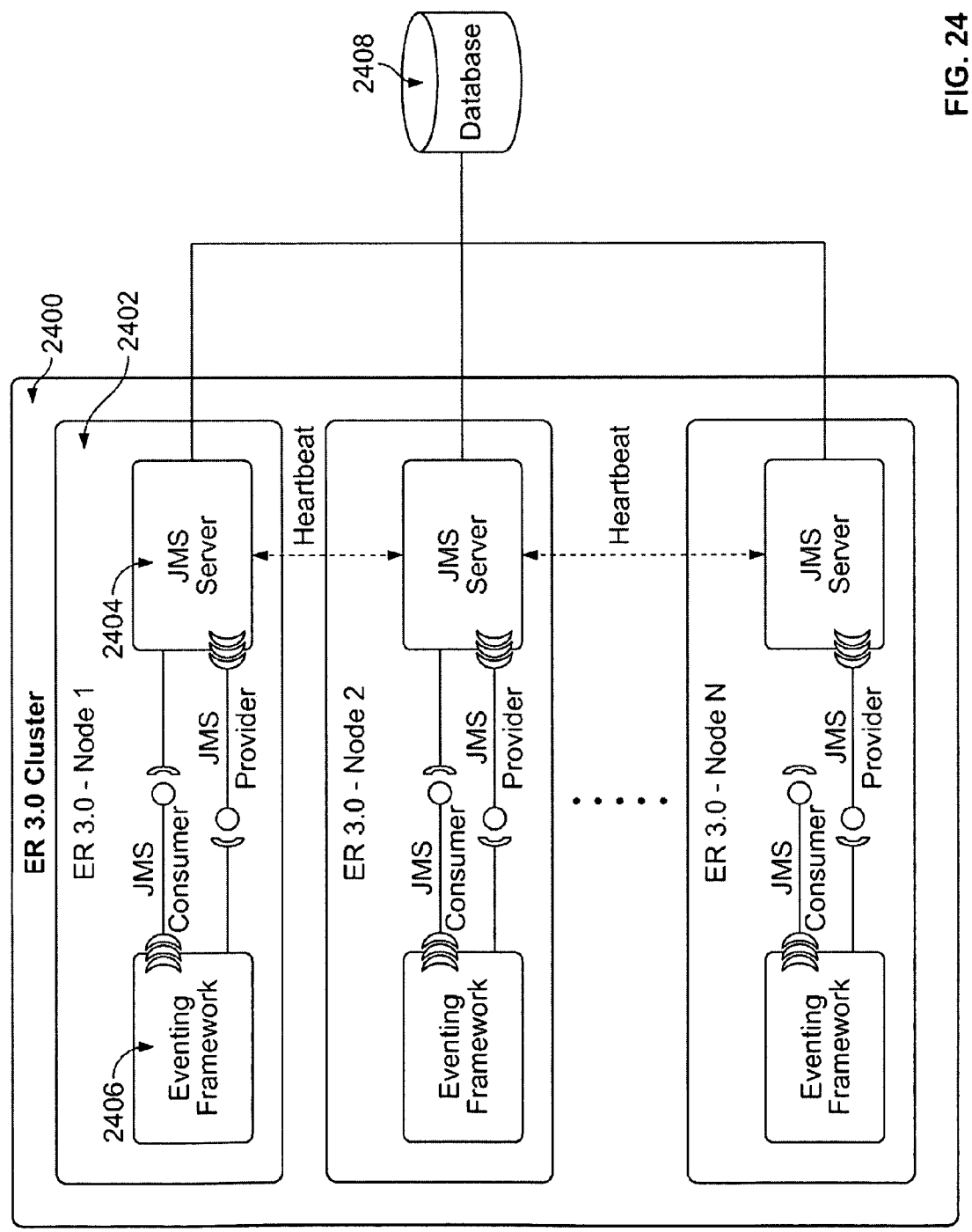
FIG. 24 illustrates clustering the metadata repository with the JMS server, in accordance with one embodiment.

FIG. 24 illustrates clustering the metadata repository with the JMS server, in accordance with one embodiment. An enterprise repository (ER) or service metadata repository is depicted organized as a cluster 2400 of repository nodes. ER Node 1 2402 contains an instance of the eventing framework 2406 that transmits events to a Java Message Service (JMS) server 2404. The JMS server maintains a heartbeat communication with the other JMS servers on other repository nodes in the cluster. Event information is persisted by the JMS servers in database 2408.

JMS Ordering and Non-Clustering

Even though the HTTP layer sends a 200 status message back to the HTTP client, HTTP cannot be used as a mechanism that ensures ordering. Consider a scenario where the HTTP Server sends a 200 message back to the client. In the window where the application picks the event and tries to checkpoint the event by storing the event, the application may crash. The next event delivery may fail and the eventing infrastructure will try to deliver the event continuously, but the previous event is lost and the ordering is lost. Ordering is not 100% guaranteed in some of the scenarios due to the before-mentioned reasons, and using JMS will not solve the issue because of the following reason. Consider two different clusters, i.e. a metadata repository and JMS. JMS guarantees ordering only when both the producers and consumers use JMS. In this case, the real consumer is an HTTP endpoint but if an endpoint chooses to use JMS, then it will obtain better ordering and reliability. Reliability can be guaranteed when the remote endpoint, i.e. a business process management endpoint, uses JMS as well. If a business process management endpoint doesn't support SOAP/JMS, one embodiment uses SOAP/HTTP with additional reliability built in. The portType for remote endpoint may optionally support a two-way request/reply pattern that sends a status message back to the HTTP client. This status message can be used by the Notifier as a confirmation mechanism that the endpoint has processed the event.

Event Data Model Considerations

Since the events are delivered using SOAP protocol, XML Schema can represent the structure of an event. XMLBeans can create Java objects from XMLSchemas that can be used as the Object model. The event structure can be serialized to XML payload when the event is delivered to the remote endpoint. Plain ordinary java objects (POJOs) was considered for performance reasons, but mapping XML to Java is a big task given the complexity of XML Schemas like inheritance, substitution groups, cardinality, different built-in types, etc. XMLBeans already takes care of the Mapping and provides the marshalling/unmarshalling layer. In one embodiment, JMS TextMessage or BytesMessage is used to encapsulate an XML/SOAP Payload.

Model Extensibility

The model can be extensible and can use Inheritance. The base model can encapsulate the generic metadata about an event and domain-specific or metadata repository specific Metadata can be extended from the base model. FIG. 11 describes the event model. The model is XML-Schema based, with domain-specific extensions. The base model provides generic metadata about an event. In one embodiment, a programmatic API to event model is provided by XML Beans.

Inter-Operability and Re-Usability Considerations

In one embodiment, when an event enters the eventing infrastructure, the event can not be modified or amended with additional data by the eventing notifier or any other module. This is to ensure that the event when stored in JMS, may be directly picked by a remote endpoint using JMS, without the need for the eventing notifier. In one embodiment, the metadata repository fires and forgets about the event. The events need to be post-processed because the metadata repository may not use Event XML Beans representation and may use its own event object. This event object will be converted to the XML Beans form and can be done in the Façade layer. In other words, the eventing infrastructure can not depend on any metadata repository classes or Jars and can be standalone so that it can be reused elsewhere. In one embodiment, if there are dependencies to metadata repository classes, then this can be approached using abstract interfaces and the core eventing infrastructure does not have any dependencies on metadata repository classes.

In one embodiment, there could be additional Metadata that can be post filled that may require using of metadata repository internal API. This processing can be done in the Façade layer as well.

XPDL Requirements

Figure 21:
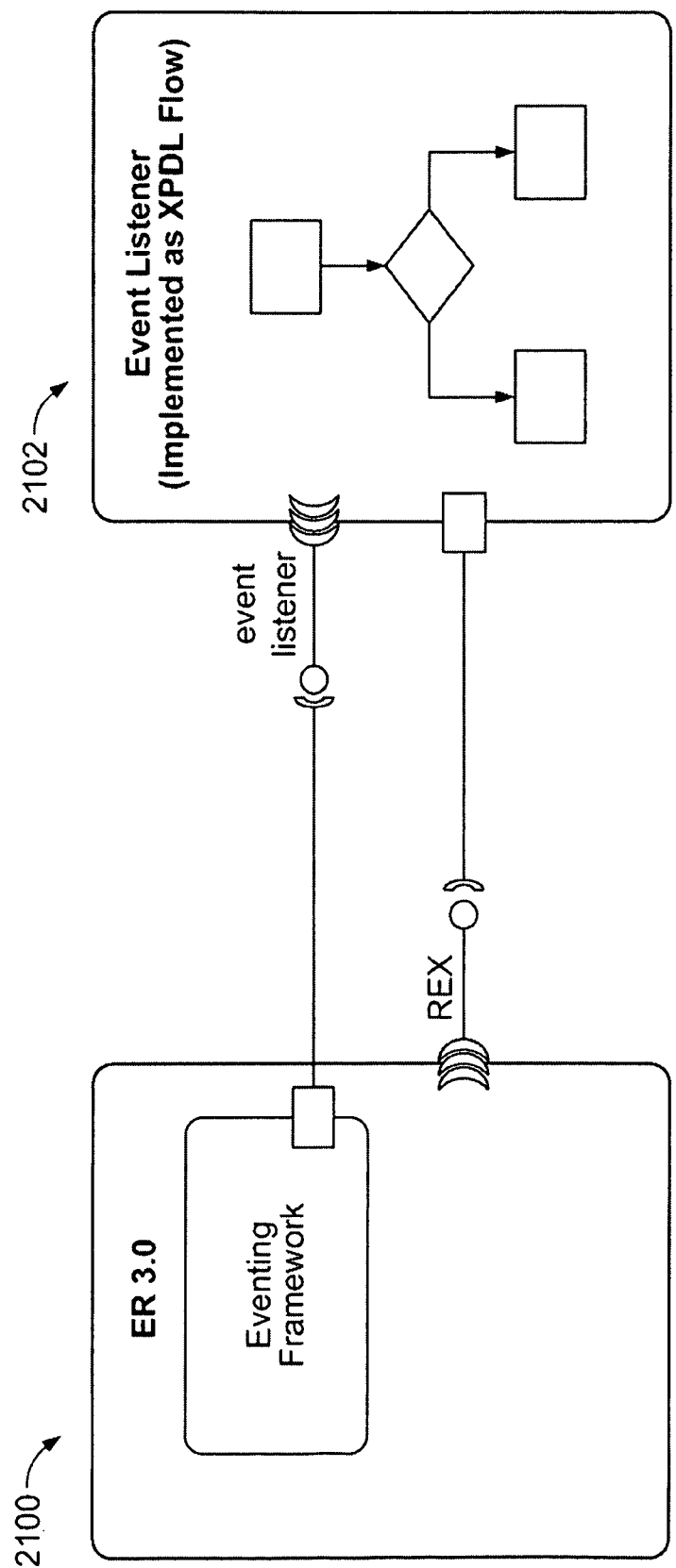
FIG. 21 illustrates an eventing framework and an event listener implemented as an XPDL flow, in accordance with one embodiment.

The next section covers the scope and requirements for the XPDL processes that are created in one embodiment of the invention. In accordance with one embodiment, FIG. 21 shows a metadata repository 2100 that generate events that are listened for by an event listener 2102 which is implemented as an XPDL process flow in a process engine.

Overview/Background

In one embodiment, the metadata repository has pre-built business process management workflows that attempt to automate asset submission, acceptance, and registration processes.

Use Cases and Requirements

In one embodiment, flows and subflows can be individually enabled or disabled by administrators.

Modify Metadata Based on Metadata Changes

When a Metadata element of an asset changes based on an event, a workflow can automatically change certain other Metadata elements. When an asset is registered, custom access settings can be changed by a workflow, i.e. when the registration status field of an asset changes from "Accepted" to "Registered," the "Custom access settings" of an asset is added or changed in the set of custom access settings previously specified by administrators. A community tag can be added by a workflow when an asset is submitted without a community tag, with the generated community tag based on producing project or asset type, with these correlations to be specified in advance by administrators. Workflows can be triggered by numerous changes, including asset name, notification and/or re-assignment. In one embodiment, a workflow may notify the following persons: subscribers; people involved in registration of asset (submitter, registrar, admin tab); or a specific list that the administrator provides.

The reassignment could be the same list as in the previous tab approval or some other mechanism. A change in asset version can trigger a workflow for a change, notification and/or re-assignment. In accordance with one embodiment, a change in asset owner triggers change, notification and/or re-assignment. A change in registration status to Registered can trigger a change in Asset Lifecycle Stage to Release or another completeness indicator. An Asset Lifecycle Stage can have values such as 'Plan,' 'Build,' etc. A change in Policy Validation state to green can trigger assignment of the asset. A change in Policy Validation state to red can trigger re-assignment of the asset and a change in classification. In one embodiment, classification is admin-selectable from an acceptable value list.

In one embodiment, a change in customer-defined fields triggers a notification or metadata change. In one embodiment, a change follows the asset name change use case pattern for notification. In one embodiment, a change in a user-specified asset metadata field triggers regression of asset one step in registration status, e.g. from accept to unaccepted, from submitted to unsubmitted, from registered to unregistered. A regression in asset registration status (reject, unaccept, or unsubmit) can also trigger a change in asset classification. In one embodiment, classification is admin-selectable from an acceptable value list. In one embodiment of a service metadata repository, a classification for an asset is a scheme where an asset will belong to "Education" etc. A change in asset active status (inactive, retire, or delete) can trigger a change in asset classification. In one embodiment, classification is admin-selectable from an acceptable value list. In one embodiment, changes to data in required fields specified by an administrator can also trigger an automated workflow.

When an asset is changed and saved, this can trigger a flow as can changes to data in other specified field(s). In one embodiment, there are additional triggers for changes to data in other specified fields. In one embodiment, missing data in required field triggers notification. In one embodiment, missing data triggers an AssetMissingField event. Changes in metadata of most kinds can cause the associated tab to be unapproved and reassign the asset to its respective assignment/approval tier of approvers.

Automatic Acceptance

One embodiment includes workflows for automatic acceptance of an asset. When assets are submitted, the workflow automatically accepts, unaccepts, or ignores the asset based on an analysis of Metadata associated with the asset. In one embodiment, the acceptance of an asset is based on the following rules: Asset Type; Community Tag; Categorizations; and Role of Submitter (if the submitter is a registrar).

Multi-tier Approval Workflow: One embodiment includes workflows for assigning assets for Multi-tier Tab approval. After the assets are accepted (whether automated or manual), the workflow automatically assigns the assets for multi-tier approval. In one embodiment, the workflow can detect each tab approval within a Tier and assign the assets for the next tier approval once all tabs are approved in the previous tier. The list of tabs (named tabs) within each Tier, the number of Tiers, and the list of users for each Tier is configurable by the users in an XML file. In one embodiment, the named tabs available can vary by asset type. In one embodiment, the tiered approval pattern can be chosen by "asset type" or "community."

Additional work flows include registering an asset automatically when all the Tabs associated with a particular asset have been approved by the appropriate approvers. After all the tabs are approved, the workflow registers the asset automatically. Another work flow approves the tabs automatically based on metadata associated with the asset. A process engine uses metadata rules to determine whether the workflow will automatically approve the tabs. In one embodiment, the flow relies upon automatic tab approval criteria based on metadata.

Time-Based Escalation

In one embodiment, illustrated in FIG. 9, when assets are assigned for Tab approvals, the flow can track the status of the approval. When the assets are not approved within a specified time (which can be configurable), then the flow can send a reminder notification. If the tab is not approved from the last notification to a delta time, then it can send the next notification. The frequency and number of notifications can be user-specified separately for each case, below. Notifications for time-based escalation can use each recipient's asset registration cc: list. Time-based notification can be available to: prompt asset creator, owner and submitter, if any, to submit or re-submit asset based on latest creation or unsubmit date; if an asset is rejected and sitting in the Rejected queue for a while, notification reminder about the fact that they need to do something about it; prompt registrar of record for the asset, if any (otherwise system registrar) to Accept asset based on latest Submission data (example of this is an asset has been submitted 10 days ago and no action has been taken); prompt latest list of assignees (see multi-tier approval workflow) to Approve Tabs based on latest assignment date; prompt registrar of record for the asset, if any (otherwise system registrar) to Register the asset based on latest all tabs approved date; prompt asset owner, last submitter/re-submitter and validation contact, if any (to re-validate asset), beginning X days prior to asset expiration date (see also validation expiration date triggers, below); prompt owner, last submitter/re-submitter and validation contact, if any to after asset expiration date; warn subscribers N days ahead of expiration date that the asset expiration date is imminent; warn subscribers that asset expiration date has been reached, and the registration status of the asset is now subject to change.

Purging after inactivity: if action is not taken, above, within a specified period of time in Time-based Escalation, then the flow can unaccept the asset. The length of time (asset_regressed): unsubmitted assets are deleted after the set period of time; submitted assets are unsubmitted after the set period of time; accepted assets are unaccepted after the set period of time; and assigned assets are unassigned after the set period of time. In alternative embodiments, there are other instances of assets sitting at a particular stage.

Community Assignments

In accordance with one embodiment, illustrated in FIG. 7A and FIG. 7B, assets can be accepted and assigned to a pre-defined Tab approvers automatically based on a "Community" tag in the incoming Metadata. There can be two sub-flows, one that can analyze the metadata and create the "Community" tag, and another flow that does the actual acceptance and assignment. The examples of Communities could be Java, SOA Center of Excellence, etc. When assets are submitted, a flow can receive the Add Community Tag to the Metadata event and analyze the metadata. Based on producing project or asset type, with these correlations to be specified in advance by administrators, it will add a community tag. The Community Assignment flow will look at the Community tag and do the actual acceptance and assignment. It may use the configuration to decide the acceptance rules and approver list.

Validation Expiration Date Triggers

In accordance with one embodiment, illustrated in FIG. 10, the AssetType will have an optional expiry-date field that may be filled when an asset is created. This flow will send a search query to an enterprise repository (ER) or service metadata repository periodically and get a list of assets that are about to expire or already expired. It will take the following actions: Asset owner, subscribers and validation contact (with cc list) are notified beginning X days in advance of asset expiration date (see time-based escalation) (prior_to_expiration). Asset reaches expiration date (+Y days) triggers unregister. In one embodiment, there is no notification since the metadata repository provides the notification (asset_expired). Asset reaches expiration date (+Z days) triggers inactive (asset_expired_change). Asset reaches expiration date (+Q days) triggers delete.

Modify Metadata Based on Metadata Changes

Figure 15:
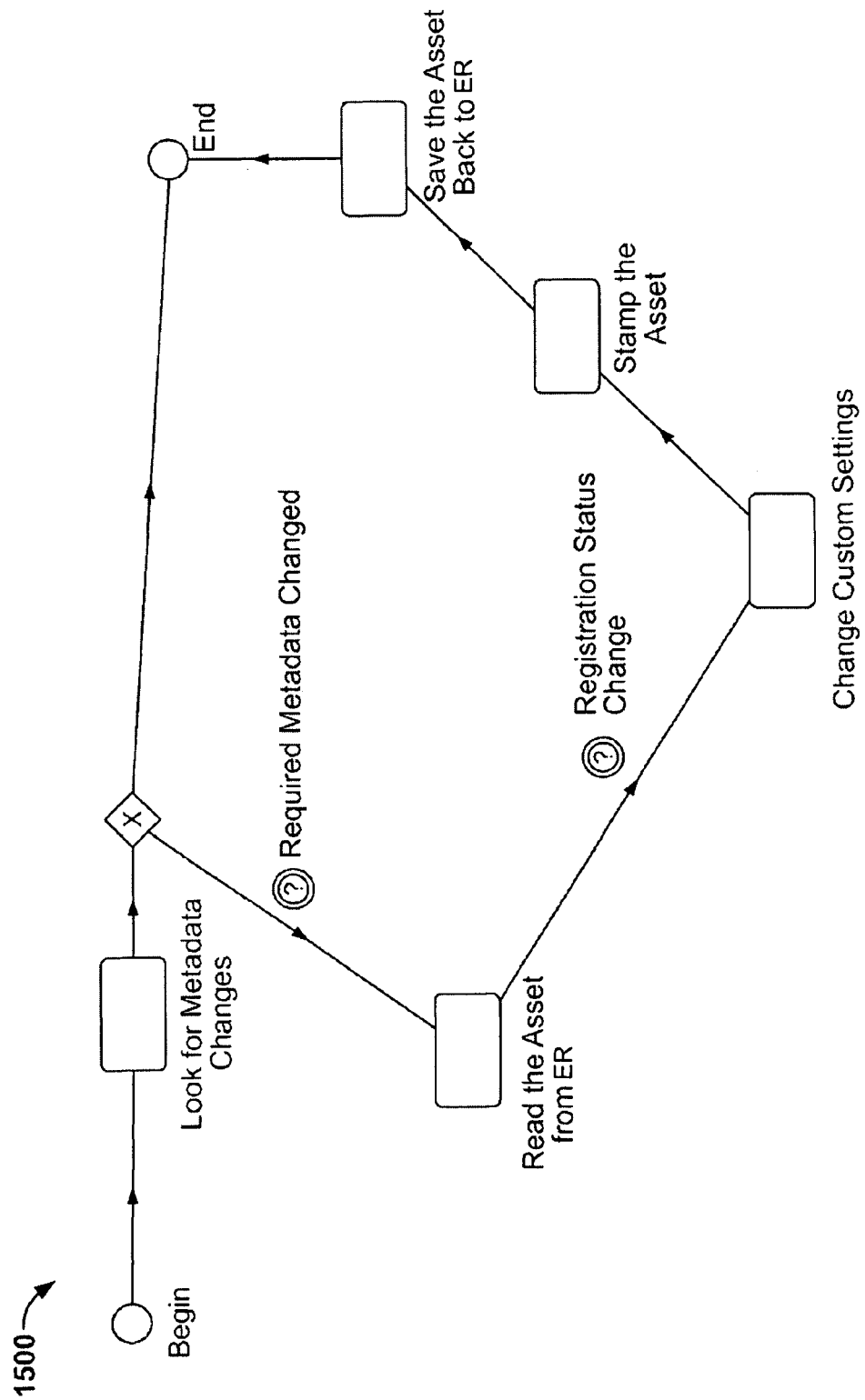
FIG. 15 illustrates changing custom access settings when an asset is registered, in accordance with one embodiment.

In accordance with one embodiment, illustrated in FIG. 15, is an example flow diagram 1500 for changing Custom Access Settings when an Asset is registered. This workflow changes custom access settings when an Asset is registered. All the tabs are approved and the asset is registered. This workflow looks for asset is registered only (not all tabs approved), just in case someone goes ahead and manually registers without all tabs being approved. An event is triggered by the metadata repository Eventing Core (via Eventing Infrastructure) that starts a business process management process. The flow will look for certain metadata values in certain fields. In this case, it will look for the Registration status change, i.e. status changing from Accepted to Registered. If there is a match, it will read the asset from the service metadata repository. The flow will alter the asset Metadata and apply the Custom Access settings. The asset is stamped so that it's not processed again when the same asset enters the flow again. The asset may be manually sent back some number of steps in the registration stages (to unregistered or even unsubmitted), and will need to depend on the same asset being reviewed and approved again. Other scenarios that cause the same asset to enter the flow again are contemplated. The altered asset is then saved back to the metadata repository.

Multi-Tier Workflow

Figure 16:
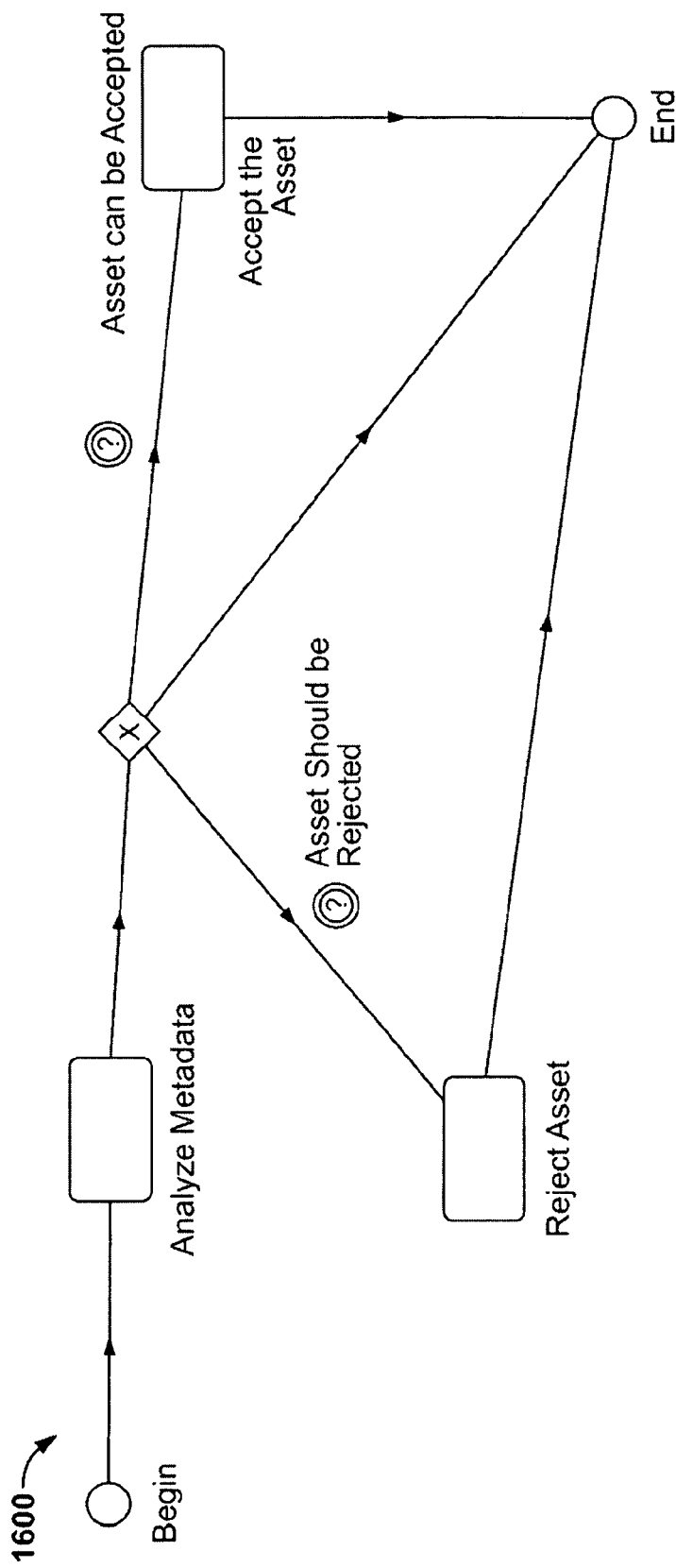
FIG. 16 illustrates automatic acceptance of an asset, in accordance with one embodiment.

In accordance with one embodiment, FIG. 16 illustrates an example flow diagram 1600 for automatic acceptance of an asset in one embodiment. An asset is submitted. Subsequently the asset enters the Submitted/Pending Review queue. An event is triggered by the metadata repository Eventing Core (via Eventing Infrastructure) that starts a business process management process. The flow analyzes the Metadata and identifies some of the following fields to determine whether the asset can be automatically accepted or not, including: how the asset was created; asset type; submitter; submitter role; submitting project; and origin. In one embodiment, reject is "unaccept" and/or "unsubmit," which keeps the asset intact and sends it back to the submitter. For historical reasons there may be an anomaly in the workflow. Things behave differently in a few places depending on whether the asset is a "quick submit" or whether it has been created in the asset editor. In accordance with one embodiment, FIG. 16 shows an alternative perspective of the workflow described in FIGS. 7A and 7B.

Figure 17:
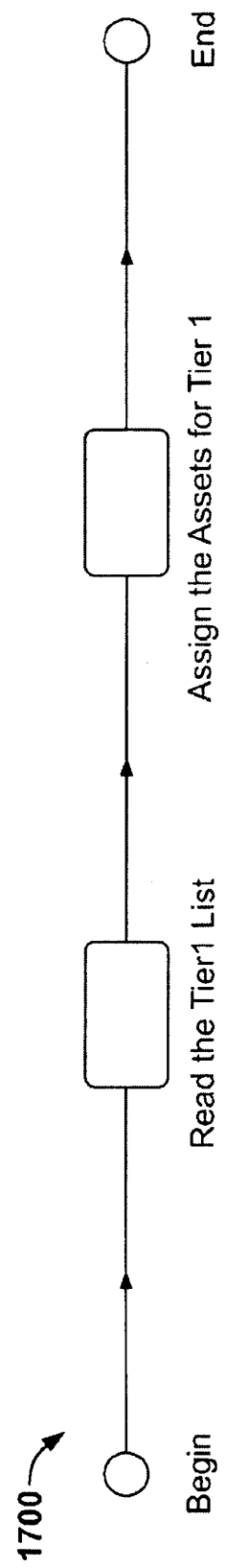
FIG. 17 illustrates a flow starting a Tier1 assignment when an asset is accepted, in accordance with one embodiment.

FIG. 17 shows a Flow 1700 that starts the Tier1 assignment when an asset is accepted in one embodiment. The asset is accepted either manually or via the XPDL flow. An event is triggered by the service metadata repository Eventing Core (via Eventing Infrastructure) that kick-starts a business process management process. The flow opens an XML based file that finds the list of users to be assigned for Tier1 Tab approval. One embodiment depends on a mapping scheme where XML file(s) can specify: 1) the asset type (or other metadata attribute that the XML file applies to; 2) the condition for assignment (e.g. acceptance of an asset or the approval of a list of specifically named tabs); 3) the list of assignees to whom the asset can be assigned; and 4) a reference to message template that can be used for the notification. In one embodiment, the notification is sent by email. Number 1) is by inspection of the metadata; number 2) is by event trigger; number 3) is populated by a list of either metadata repository or LDAP names (up to the admin initially to ensure that the names have the right permissions); and number 4) can key off the email templates already existing for assignment, or can allow admins to create new ones. The flow then assigns the Tier1 approvers via a Webservices call to a metadata repository.

Figure 18:
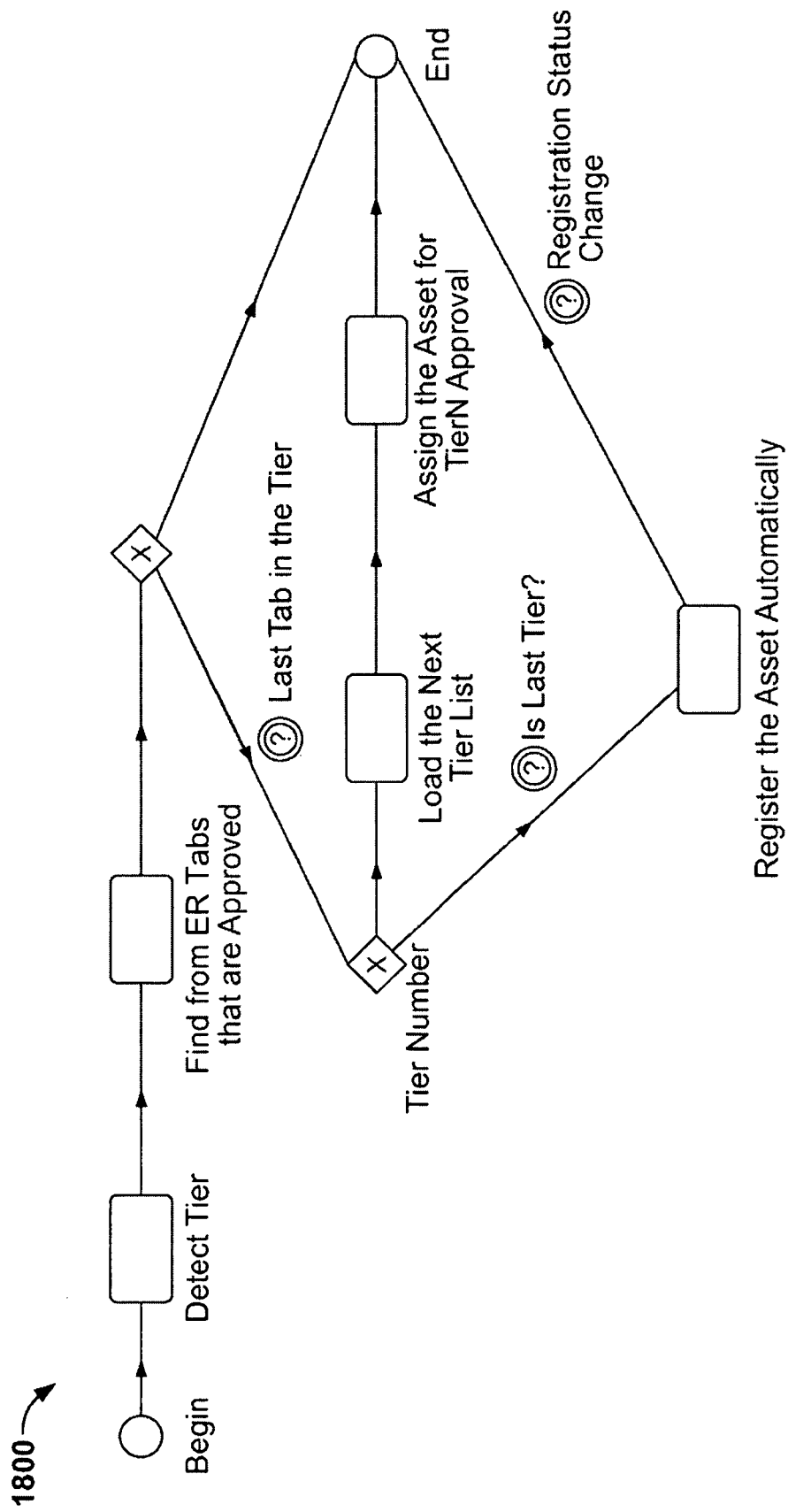
FIG. 18 illustrates a flow starting a TierN assignment when a tab is approved, in accordance with one embodiment.

FIG. 18 shows a Flow 1800 that starts TierN when a Tab is approved in one embodiment. Flow that starts TierN when a Tab is approved. A tab is approved for an asset. An event is triggered by the metadata repository Eventing Core (via Eventing Infrastructure) that starts a business process management process. The flow will detect which tier this approval belonged to by loading an XML based file and comparing the incoming Metadata. The flow will then send a request to the metadata repository (or if that information is already in the Event metadata, it won't send a request) and find out all the tabs that are approved in that tier so far. If this is the last tab in that Tier, the flow will load the next batch of approvers and send a request to the metadata repository for assigning the asset. (In one embodiment, approvers are metadata repository userids.) The list of approvers can be easy to populate from other sources e.g. LDAP, or list of users in a particular metadata repository role. If this is the last Tier, the flow can register the asset automatically. In one embodiment, the flow shows which steps in the workflows trigger notifications. The work flow can register the assets automatically when all the Tabs are approved. This flow is separate from the assign assets scenario, first, so it can be a building block for use with other flows, and second, because users may want to do automatic assignment but not automatic registration. In accordance with one embodiment, FIG. 16 shows an alternative perspective of the workflow described in FIGS. 7A and 7B.

Figure 19:
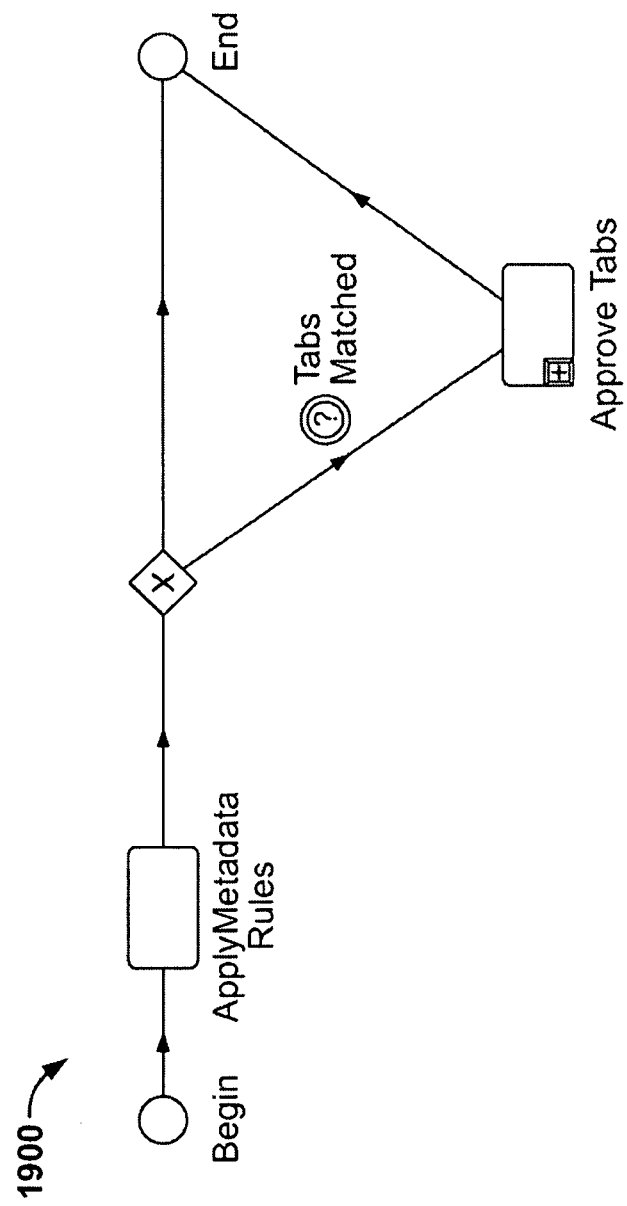
FIG. 19 illustrates a flow automatically approving tabs, in accordance with one embodiment.

FIG. 19 shows a flow 1900 that approves the tabs automatically in one embodiment. This approval workflow approves the tabs automatically after an asset is accepted and an event is triggered by the service metadata repository Eventing Core (via Eventing Infrastructure) that starts a business process management process. In one embodiment, the Event Metadata has enough information to process the flow. In an alternative embodiment, the Asset needs to be loaded from the metadata repository. The flow will apply certain Metadata rules. In one embodiment, a suggested list of metadata to automatically approve tabs is provided. If the rules match, then the flow will send a request to the metadata repository to approve as many tabs as it matches.

Time Based Escalation

Figure 20:
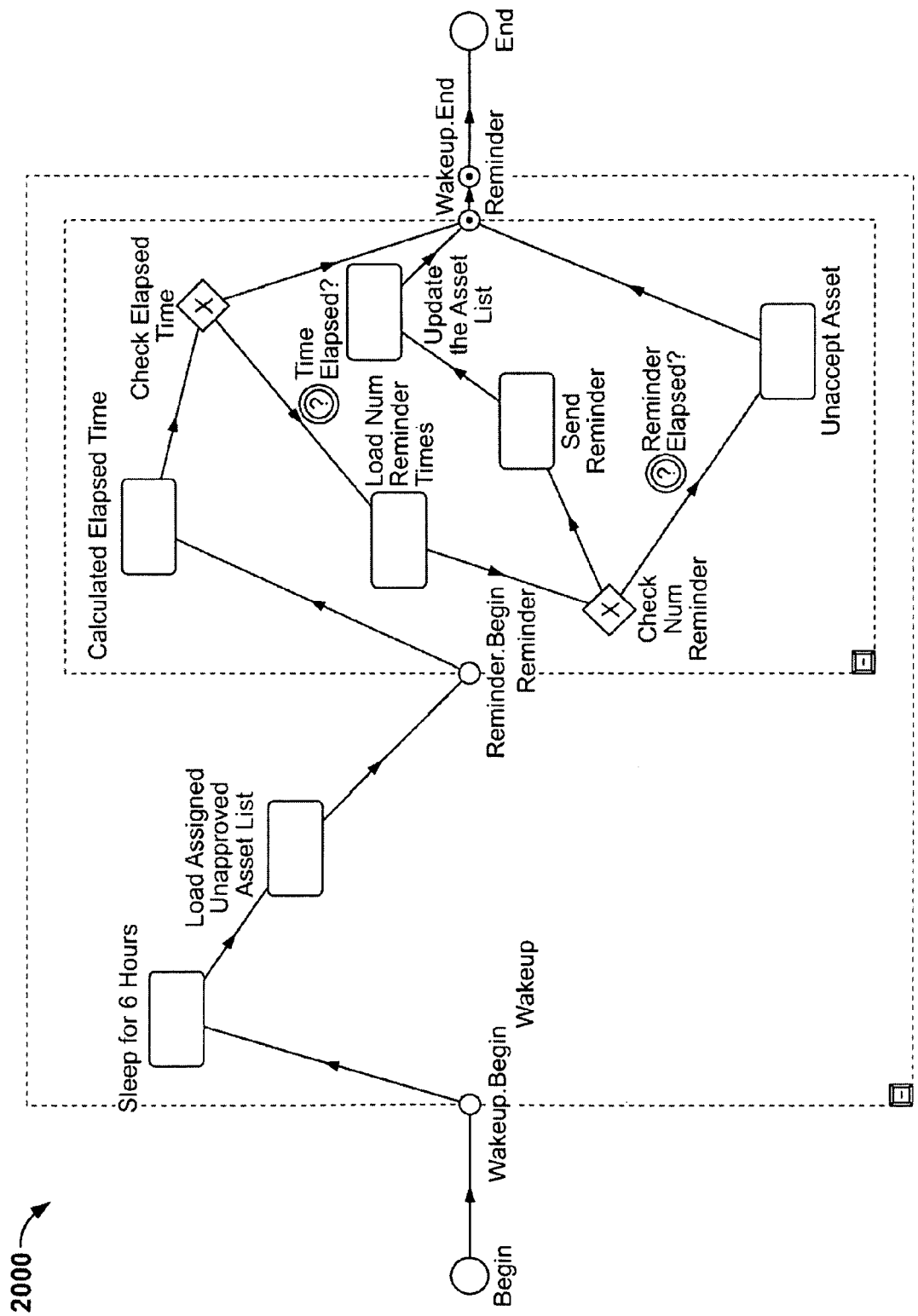
FIG. 20 illustrates a flow for time based escalation, in accordance with one embodiment.

FIG. 20 shows a flow 2000 for Time based escalation in one embodiment. When an asset is accepted, tab approvals are assigned by the Multi-tier Workflow. The Multi-tier Workflow will also create an entry for this asset with the Tab approval information to a persistence store. When a Tab is approved, the Multi-tier Workflow will also update the status in the persistence store. The Time Based Escalation is a long running Workflow running in a loop that wakes up every 6 hours. Each time it wakes up, it will load the unapproved tab asset list. The flow will calculate whether the time is elapsed from the incoming Metadata and also from the configuration. If the time elapsed, it will send a reminder notification. After the second reminder elapsed, it will unaccept the asset. In one embodiment, the time elapse will be calculated based on one of the following: Last submitted Date; Last assigned Date; and Custom Date.

Community Assignment

FIG. 16 shows a flow for community assignment in one embodiment. An asset is submitted. It enters the Submitted/Pending Review queue. An event is triggered by the service metadata repository Eventing Core (via Eventing Infrastructure) that starts a business process management process. The flow analyzes the Metadata and it looks for Community tag. If it finds the Community Tag, then it finds the entry for this Community tag value from the Configuration file. The entry will decide whether this asset can be accepted automatically and if so, who the approvers are. Acceptance is not based on community tag, but the approval pattern flow is (which approvers and tiers).

Administrator Configuration

In accordance with one embodiment, workflows can be configured by service metadata repository administrators for customizing the workflows to suit specific needs. In one embodiment, the following are items that can be configured:

Modify Metadata based on Metadata changes: Change Custom access settings when the asset is registered. The custom access settings that are applied to an asset are configured in an XML file.

Multi-tier Workflow: Assign assets for Tab approval. The Configuration file can list down all the asset types with named tabs available for that asset. The following information can be configured: 1) the asset type (or other metadata attribute that the XML file applies to); 2) the condition for assignment (e.g. acceptance of an asset or the approval of a list of specifically named tabs); and 3) the list of assignees to whom the asset can be assigned.

Register the asset automatically: This capability adds the ability for administrators to determine which assets are handled this way according to a metadata field, e.g. if the asset is a service, do not auto register, but if the asset is a Java component, go ahead and register it. These are just examples. The logic can be captured in a simple if type=A then Register.

Time based escalation: The time elapse can be calculated based on one of the following which can be configured: Last submitted Date; Last assigned Date; or Custom Date.

Community Assignments: In one embodiment, the Communities are configured in a configuration file.

In one embodiment, administrators are able to configure what flows can be loaded and started by a BPM Engine. In one embodiment, the deployment mechanism deploys only enabled flows. In an alternative embodiment, a Subscription mechanism enables or disables certain endpoints thereby making the Endpoints not receive events at all. Another option is to make the flow inactive when the flow is not enabled. In one embodiment, the user can use different workflows to accept assets. In one embodiment, the user has alternatives on how to trigger the flows. In one embodiment, there are metadata rules to approve the tabs automatically.

Figure 26:
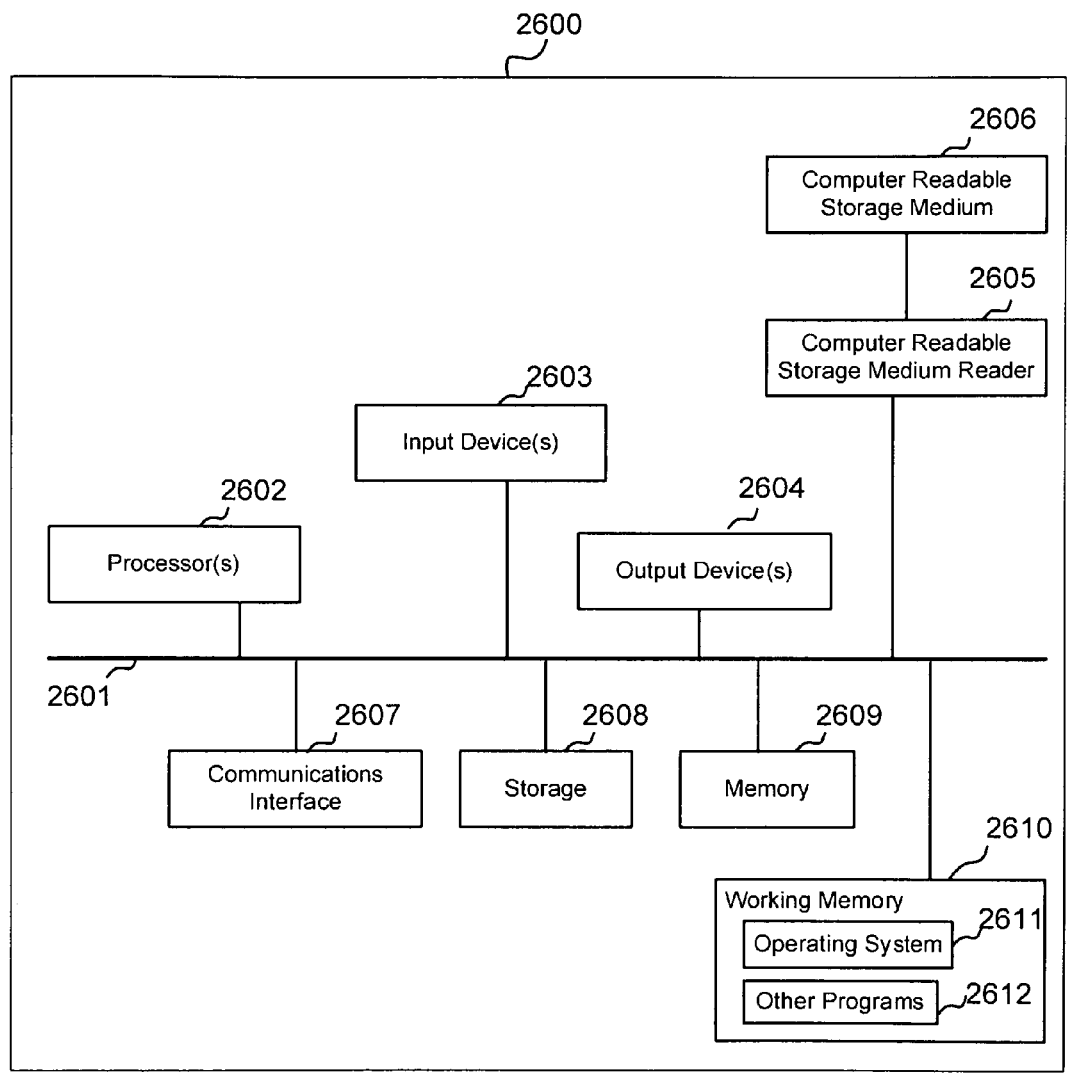
FIG. 26 illustrates a hardware block diagram of an example computer system, which may be used to embody one or more components, in accordance with one embodiment.

FIG. 26 illustrates an exemplary processing system 2600, which can comprise one or more of the elements of FIG. 2, FIG. 3, and FIG. 4. While other alternatives might be utilized, it can be presumed that the components of the systems of FIG. 2, FIG. 3, and FIG. 4 are implemented in hardware, software or some combination by one or more computing systems consistent therewith, unless otherwise indicated.

Computing system 2600 comprises components coupled via one or more communication channels (e.g., bus 2601) including one or more general or special purpose processors 2602, such as a Pentium®, Centrino®, Power PC®, digital signal processor ("DSP"), and so on. System 2600 components also include one or more input devices 2603 (such as a mouse, keyboard, microphone, pen, and so on), and one or more output devices 2604, such as a suitable display, speakers, actuators, and so on, in accordance with a particular application. (It can be appreciated that input or output devices can also similarly include more specialized devices or hardware/software device enhancements suitable for use by the mentally or physically challenged.)

System 2600 also includes a computer readable storage media reader 2605 coupled to a computer readable storage medium 2606, such as a storage/memory device or hard or removable storage/memory media; such devices or media are further indicated separately as storage 2608 and memory 2609, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 2607 may also be included, such as a modem, DSL, infrared, RF or other suitable transceiver, and so on for providing inter-device communication directly or via one or more suitable private or public networks or other components that may include but are not limited to those already discussed.

Working memory 2610 further includes operating system ("OS") 2611 elements and other programs 2612, such as one or more of application programs, mobile code, data, and so on for implementing system 2600 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 2612 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 2608 or memory 2609) in accordance with a particular application. Embodiments can include computer-based methods and systems which may be implemented using a conventional general purpose computer(s) or a specialized digital computer(s) or microprocessor(s), programmed according to the teachings of the present disclosure. Appropriate software coding can readily be prepared by programmers based on the teachings of the present disclosure.

Embodiments can include computer-based methods and systems which may be implemented using a conventional general purpose computer(s) or a specialized digital computer(s) or microprocessor(s), programmed according to the teachings of the present disclosure. Appropriate software coding can readily be prepared by programmers based on the teachings of the present disclosure.

Embodiments can include a computer readable medium, such as a computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling the hardware of a computer, such as a general purpose/specialized computer(s) or a microprocessor(s), and for enabling them to interact with a human user or other mechanism utilizing the results of the present invention. Such software may include, but is not limited to, device drivers, operating systems, execution environments/containers, and user applications.

Embodiments can include providing code for implementing processes. The providing can include providing code to a user in any manner. For example, the providing can include providing the code on a physical media to a user; or any other method of making the code available.

Embodiments can include a computer-implemented method for transmitting the code which can be executed at a computer to perform any of the processes of embodiments. The transmitting can include transfer through any portion of a network, such as the Internet; through wires; or any other type of transmission. The transmitting can include initiating a transmission of code; or causing the code to pass into any region or country from another region or country. A transmission to a user can include any transmission received by the user in any region or country, regardless of the location from which the transmission is sent.

The foregoing description of preferred embodiments has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A system for automatic asset acceptance workflows in a service metadata repository, comprising:
   one or more microprocessors;
   a service metadata repository executing on the one or more microprocessors and including an event manager, wherein the event manager generates an event based on a change to an asset, said event initiated by a submitter having a role;
   a subscription service for registering a subscribed web service endpoint to receive the event upon notification by an event notification service;
   one or more workflows, wherein upon receiving the event at the subscribed web service endpoint, the one or more workflows use a set of rules configured in a configuration file to
      determine whether the asset qualifies for automatic acceptance,
      compare, when the asset qualifies for automatic acceptance, the role of the submitter with approved roles stored in the configuration file, and
      automatically accept the asset into the service metadata repository when the submitter matches one of the approved roles in the configuration file;
   wherein metadata associated with the asset is analyzed to generate tags related to a type of the asset, a community of the asset and a categorization of the asset;
   wherein determining whether the asset qualifies for automatic acceptance includes identifying a setting indicating auto acceptance within the generated tags, in order of preference, of
      (1) the type of the asset,
      (2) the community of the asset, and
      (3) the categorization of the asset; and
   at least two tiers of approvers, comprising a first tier and second tier, wherein upon the asset being accepted an approver from the first tier of approvers is automatically assigned via the one or more workflows for determining whether to approve the asset, and upon approval by the approver from the first tier, an approver from the second tier of approvers is automatically assigned via the one or more workflows for determining whether to approve the asset, wherein the asset is approved when all tiers of approvers approve the asset;

wherein the one or more workflows include a workflow to periodically track registration status and asset expiration status and send reminders and a workflow to periodically track expired assets and delete the expired assets.

2. The system of claim 1, wherein the notification service notifies the subscribed web service endpoint using SOAP via HTTP, JMS, or another transport protocol using a pluggable extension.

3. The system of claim 1, wherein the event is generated by a change in an asset lifecycle stage.

4. The system of claim 1, wherein a business process management system executes the one or more workflows after receiving the event from the subscribed web service endpoint.

5. The system of claim 1, wherein the one or more workflows include workflows to intercept metadata changes and take pre-defined actions.

6. The system of claim 1, wherein the one or more workflows can be customized to handle state changes.

7. The system of claim 1, wherein the event is filtered using the rules configured in the configuration file and delivered in a reliable, scalable, clustered fashion to pre-defined business process management web service endpoints.

8. A method for an automatic asset acceptance workflow in a service metadata repository, comprising:

providing a service metadata repository that executes on one or more microprocessors and includes an event manager;

receiving an asset for submission from a submitter at the service metadata repository, wherein the submitter has a role associated therewith;

generating, by the event manager, an event based on the submission of the asset;

providing a subscription service for registering a subscribed web service endpoint to receive the event upon notification by an event notification service;

providing one or more workflows, wherein upon receiving the event at the subscribed web service endpoint, the one or more workflows use a set of rules configured in a configuration file to determine whether the asset qualifies for automatic acceptance, compare, when the asset qualifies for automatic acceptance, the role of the submitter with approved roles stored in the configuration file, and automatically accept the asset into the service metadata repository when the submitter matches one of the approved roles in the configuration file;

analyzing metadata associated with the asset to generate tags related to a type of the asset, a community of the asset and a categorization of the asset;

wherein determining whether the asset qualifies for automatic acceptance includes identifying a setting indicating auto acceptance within the generated tags, in order of preference, of (1) the type of the asset,
(2) the community of the asset, and
(3) the categorization of the asset;

determining, upon the asset being accepted, with an approver automatically assigned via the one or more workflows from a first tier of approvers selected from at least two tiers of approvers, whether to approve the asset;

determining, upon approval by the approver from the first tier, with an approver automatically assigned via the one or more workflows from a second tier of approvers, whether to approve the asset;

approving the asset when all tiers of the approvers approve the asset;

providing one or more workflows to periodically track registration status and asset expiration status and send reminders; and providing one or more workflows to periodically track expired assets and delete the expired assets.

9. The method of claim 8, further comprising:

providing a workflow for automatically notifying assigned approvers that the asset has been submitted and is waiting for approval.

10. The method of claim 8 further comprising:

notifying, by the notification service, the subscribed web service endpoint using SOAP via HTTP, JMS, or another transport protocol using a pluggable extension.

11. The method of claim 8 further comprising:

generating the event when a change in an asset lifecycle stage is detected.

12. The method of claim 8 further comprising:

executing, by a business process management system, the one or more workflows after receiving the event from the subscribed web service endpoint.

13. The method of claim 8 further comprising using the one or more workflows to intercept metadata changes and take pre-defined actions.

14. The method of claim 8 further comprising customizing the one or more workflows to handle state changes.

15. The method of claim 8 further comprising:

filtering the events using rules configured in the configuration file, and wherein the events are delivered in a reliable, scalable, clustered fashion to pre-defined business process management web service endpoints.

16. A non-transitory computer readable storable medium storing one or more sequences of instructions for an automatic asset acceptance workflow in a service metadata repository, wherein said instructions, when executed by one or more processors, cause the one or more processors to execute the steps comprising:

providing a service metadata repository that includes an event manager;

receiving an asset for submission from a submitter at the service metadata repository, wherein the submitter has a role associated therewith;

generating, by the event manager, an event based on the submission of the asset;

providing one or more workflows, wherein upon receiving the event at the subscribed web service endpoint, the one or more workflows use a set of rules configured in a configuration file to determine whether the asset qualifies for automatic acceptance, compare, when the asset qualifies for automatic acceptance, the role of the submitter with approved roles stored in the configuration file, and automatically accept the asset into the service metadata repository when the submitter matches one of the approved roles in the configuration file;

analyzing metadata associated with the asset to generate tags related to a type of the asset, a community of the asset and a categorization of the asset;

wherein determining whether the asset qualifies for automatic acceptance includes identifying a setting indicating auto acceptance within the generated tags, in order of preference, of
  (1) the type of the asset,
  (2) the community of the asset, and
  (3) the categorization of the asset;

determining, upon the asset being accepted, with an approver automatically assigned via the one or more workflows from a first tier of approvers selected from at least two tiers of approvers, whether to approve the asset;

determining, upon approval by the approver from the first tier, with an approver automatically assigned via the one or more workflows from a second tier of approvers, whether to approve the asset;

approving the asset when all tiers of the approvers approve the asset;

providing one or more workflows to periodically track registration status and asset expiration status and send reminders; and providing one or more workflows to periodically track expired assets and delete the expired assets.

* * * * *

UNITED STATES PATENT AND TRADEMARK OFFICE
CERTIFICATE OF CORRECTION

PATENT NO. : 9,589,250 B2  
APPLICATION NO. : 12/352583  
DATED : March 7, 2017  
INVENTOR(S) : Palanisamy et al.

Page 1 of 1

It is certified that error appears in the above-identified patent and that said Letters Patent is hereby corrected as shown below:

In the Specification

In Column 6, Line 65, delete "handles" and insert -- handle() --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*